United States Patent
Russell et al.

(10) Patent No.: US 10,966,265 B2
(45) Date of Patent: Mar. 30, 2021

(54) INTERWORKING SYSTEM AND OPERATION IN V2X APPLICATIONS

(71) Applicant: BlackBerry Limited, Waterloo (CA)

(72) Inventors: Nicholas James Russell, Newbury (GB); Gordon Peter Young, Kineton (GB); Stephen McCann, Southampton (GB)

(73) Assignee: BlackBerry Limited, Waterloo (CA)

( * ) Notice: Subject to any disclaimer, the term of this patent is extended or adjusted under 35 U.S.C. 154(b) by 22 days.

(21) Appl. No.: 16/437,874

(22) Filed: Jun. 11, 2019

(65) Prior Publication Data
US 2020/0396782 A1 Dec. 17, 2020

(51) Int. Cl.
| | | |
|---|---|---|
| *H04W 76/15* | (2018.01) | |
| *H04W 4/40* | (2018.01) | |
| *G08G 1/00* | (2006.01) | |
| *H04W 12/00* | (2021.01) | |
| *H04W 36/32* | (2009.01) | |

(52) U.S. Cl.
CPC .............. *H04W 76/15* (2018.02); *G08G 1/22* (2013.01); *H04W 4/40* (2018.02); *H04W 12/00305* (2019.01); *H04W 36/32* (2013.01)

(58) Field of Classification Search
None
See application file for complete search history.

(56) References Cited

U.S. PATENT DOCUMENTS 10,440,668 B1 * 10/2019 Wu ........................ G08G 1/22
2015/0215990 A1    7/2015 Lee et al.
2018/0365909 A1 * 12/2018 Cheng ..................... H04L 67/12
2019/0349719 A1 * 11/2019 Pattan ..................... H04W 4/40
2020/0021355 A1 *  1/2020 Pinheiro ............. H04B 7/15528
2020/0113015 A1 *  4/2020 Basu Mallick ....... H04W 48/18

FOREIGN PATENT DOCUMENTS

| WO | 2017052488 A1 | 3/2017 |
| WO | 2017189035 A1 | 11/2017 |
| WO | 2018/202797 A1 | 11/2018 |

OTHER PUBLICATIONS

Extended European Search Report dated Jul. 3, 2020 from EP 20169526.9, 10 pgs.

* cited by examiner

*Primary Examiner* — Rebecca E Song
(74) *Attorney, Agent, or Firm* — Jenna L. Wilson; Wilson Lue LLP

(57) ABSTRACT

A communication system and method for supporting a plurality of vehicle-to-everything radio access technologies (V2X RATs) is provided. The communication system configured to support multiple V2X RATs transmits, using a first V2X RAT, an indication of its availability to support an interworking function between the plurality of V2X RATs. The communication system receives an instruction to provide the interworking function between different V2X RATs. The interworking function may be incorporated in a vehicle that is joined to a platoon configured to use a first V2X RAT, and provide the interworking function between the first and a second V2X RAT. The interworking function may be used to add further vehicles to the platoon that communicate using only the second V2X RAT.

60 Claims, 13 Drawing Sheets

INTERWORKING SYSTEM AND OPERATION IN V2X APPLICATIONS

TECHNICAL FIELD

This disclosure relates to wireless communications, and in particular to systems for providing interoperability between different vehicle-to-everything (V2X) wireless communication systems.

TECHNICAL BACKGROUND

"Smart" control systems such as intelligent transportation systems rely on wireless communications between entities (e.g., ground or aerial vehicles, which may or may not be autonomously or semi-autonomously controlled) to share relevant sensor and other data, and to pass configuration and control messages, and the like. However, there exist several possible standards for wireless communications for these purposes, and these standards, and the underlying technology, are continually evolving. This poses a challenge for operators and manufacturers of equipment such as vehicles for intelligent transportation systems to ensure that newer equipment continues to be compatible with older equipment.

BRIEF DESCRIPTION OF THE DRAWINGS

In drawings which illustrate by way of example only embodiments of the present invention.

DETAILED DESCRIPTION OF THE INVENTION

Figure 1:
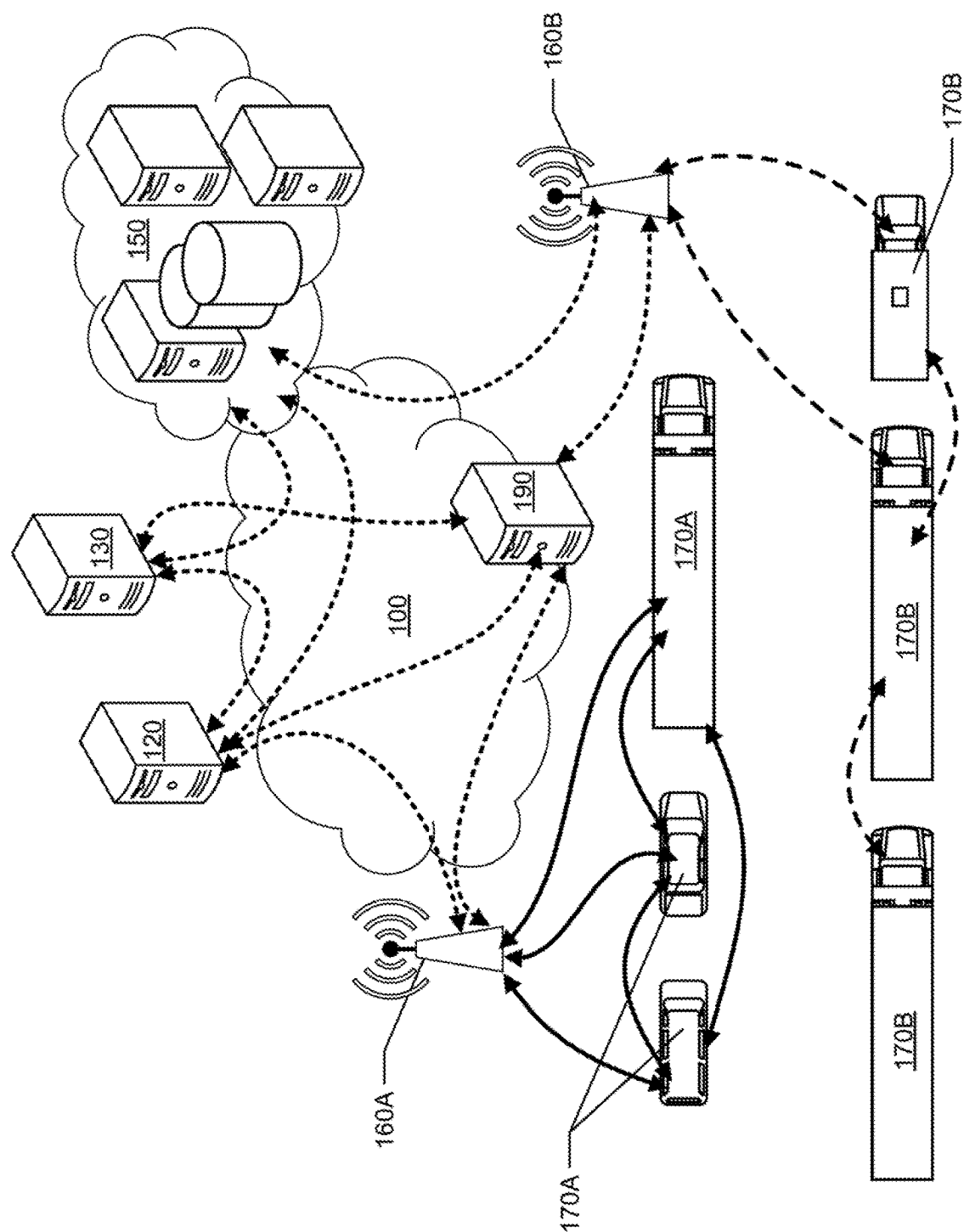
FIG. 1 is an example network topology depicting a system for use by a platooning application or other V2X application.

Intelligent transportation systems, including autonomous and semi-autonomous vehicles, are under development with the purpose of improving efficiency and safety. Sensor systems (e.g., radar, lidar, sonar, global positioning system (GPS), etc.) and a measure of intelligence are added to vehicles, and even to roadside units (RSUs) (e.g., traffic light controllers), to enable vehicles to detect and react to surrounding vehicles, obstacles, and pedestrians while minimizing reliance on human input.

To facilitate these intelligent systems, communication amongst vehicles and between vehicles and other entities is required: vehicle-to-vehicle (commonly referred to as V2V), vehicle-to-infrastructure, such as roadside units (V2I); with pedestrians (V2P); with electronic devices (V2D), and particularly in the case of electric or hybrid vehicles, the electricity grid (V2G). Collectively, communications between a vehicle and another entity are referred to as vehicle-to-everything communications (V2X).

However, competing development of architectures and standards for V2X—not all necessarily using the same wireless communication and transport protocols—and continuous technological advancement pose challenges for vehicle manufacturers and operators wishing to employ an intelligent system. Consider the example of vehicle platooning or flocking. Platooning groups or links together a plurality of vehicles, which may communicate with each other to form a physical convoy that may, for example, drive closer together by synchronizing speed, acceleration, and braking; or drive at a constant speed. In some implementations, one vehicle in the convoy (e.g. the lead vehicle in a line of vehicles), or a remote vehicle, server or system that is not part of the platoon, may control the vehicles of the platoon; or alternatively, some or all of the vehicles in the platoon may be autonomously controlled. Platooning can provide efficiencies in the form of improved fuel efficiency and lower emissions (e.g., because less braking is required), safety (because speed and spacing between vehicles is controlled), and more efficient road use; and, of course, if there is a human occupant in a platoon vehicle, reduced reliance on human input in driving the vehicle may permit the human to engage in other tasks besides driving, reduce human fatigue or enable longer continuous journeys.

For vehicles to be part of a platoon in an intelligent transportation system, they need to be capable of communicating with other members of their platoon in order to support the cooperative behaviours required of platoon members. With current technology, this implies that all vehicles in the platoon must support a common V2X radio access technology (V2X RAT). There are, however, a variety of different V2X architectures and standards including, but not limited to, European Telecommunication Standards Institute (ETSI) Intelligent Transport Systems (ETSI ITS), Society of Automotive Engineers (SAE) International Dedicated Short Range Communications for Wireless Access in Vehicular Environments (SAE DSRC), and SAE International Cellular V2X (SAE C-V2X). Cellular-based V2X (C-V2X) technologies rely on one or both of $4^{th}$ generation cellular/Long-Term Evolution (4G/LTE—also known as Enhanced Universal Mobile Telephony System Terrestrial Radio Access Network (E-UTRAN)) and $5^{th}$ Generation cellular New Radio (5GNR) wireless broadband technology, whereas non-cellular V2X technologies, such as ETSI ITS and SAE DSRC, are wireless local area network (WLAN) based, relying on one or more of the IEEE 1609, IEEE 802.11bd and IEEE 802.11p standards. Even those V2X architectures relying on the same physical communication technology may not be compatible as they may use different feature sets, transport protocols, messaging formats, and/or applications. For example, ETSI messaging formats include Cooperative Awareness Message (CAM) as defined in ETSI EN 302 637-2, and Decentralized Environmental Notification (DENM) as defined in ETSI EN 302 637-3. Examples of SAE messaging include Basic Safety Message (BSM) and Common Safety Request (CSR) as defined in SAE J2735. These are only a few examples; other types of V2X messaging may be used in various V2X systems. Current V2X architectures and standards, and associated applications such as platooning, will be known to those skilled in the art. Thus, when different or distinct V2X RATs are referenced herein, these different V2X RATs may include the same standard employing different feature sets.

Currently, it is not always feasible for all vehicles to support a common V2X RAT, whether due to cost, or the fact that newer vehicles may be equipped with newer-generation technology as standards are retired and replaced, while older vehicles have not yet been decommissioned. The result is that vehicles with incompatible V2X RATs may not be able to participate together in a single platoon, thus limiting the ability of a given vehicle to participate in platoons that may be available in a given location, at a given time. Platoons that can be formed using a common V2X RAT may be limited in size, as some otherwise-available vehicles must be excluded; this may reduce overall efficiency in the operation of the vehicles, as some of the benefits of platooning (e.g., fuel efficiency, safety) may be reduced. Additionally, multiple platoons may need to be created to accommodate different V2X RATs, increasing computational burden on the entities managing and controlling the platoons. Furthermore, the incompatibility in technologies may result in a first vehicle or platoon employing a first V2X RAT being unaware of another vehicle employing an incompatible second V2X RAT.

The need for all vehicles in a platoon to share a common V2X RAT can result in technology "lock-in" for some operators or manufacturers, in which the older V2X technology is installed in newer vehicles to ensure compatibility with existing vehicles because the cost of switching an entire fleet is deemed too high. This may slow take-up of newer or competing V2X technologies that may nevertheless be superior to the older technology.

Accordingly, the following examples provide a communication system and method providing an interworking function between different entities (e.g., platoon entities) to extend communications from a first RAT to a second RAT, and optionally to additional RATs. In the context of an intelligent system comprising groups of automated, autonomous or semi-autonomous entities, the interworking function can enable the intelligent system to build a larger fleet or group of entities that are able to communicate amongst themselves even if they do not all use the same RAT. This can be used to extend the range of cooperative and awareness messaging among entities in the intelligent system.

These concepts are set out with reference to the example system set out in FIG. 1, which schematically depicts a scenario in which one or more platoons of vehicles may be configured and controlled. FIG. 1 depicts several types of entities: operating entities 170A and 170B; management entities 120, 130; and server system 150, which may be employed in the control of one or more platoons or management entities 120, 130. The operating entities 170A, 170B in this example are various types of ground vehicles such as automobiles, trucks/lorries, and semi-trailer trucks/lorries; however, the operating entities need not be so limited, nor need they all be the same species. For example, the operating entities may be, or may include, aerial vehicles, manufacturing machinery, or other equipment, mobile machines or vehicles. The operating entities may be directly human-controllable (e.g., in the case of a ground transport vehicle, occupied and driven by a human) or remotely controllable by a human, or else may be controlled by wholly autonomous or semi-autonomous systems. In the context of a platoon of ground vehicles, a typical arrangement may have a human-controlled or semi-autonomous lead vehicle, and an accompanying set of one or more autonomous or semi-autonomous following vehicles.

The operating entities 170A, 170B in this example are each equipped with a communication system, generally described below, enabling wireless communication using at least one RAT. For example, operating entities 170A may be provisioned with a communication system enabling them to communicate using a first RAT, whereas operating entities 170B may be provisioned with a communication system enabling them to communicate using a second RAT. It should be understood that the number of entities 170A, 170B is not a limitation to the concepts described herein.

The first and second RATs may be differentiated by an incompatibility. For example, the first and second RATs may employ different wireless communication technologies, for which the operating entities 170B, 170A are not equipped (e.g., LTE or other cellular communication, versus wireless local area network (WLAN) communication); or, even if the RATs employ the same wireless communication technologies, there may be incompatibility due to the use of different wireless access standards (e.g., in the context of V2X communication, ETSI ITS vs SAE DSRC); or, even where the same technologies and standards are employed, the first and second RATs may differ by version, resulting in some incompatibility or discontinuity in messaging or applications. This incompatibility may prevent an operating entity 170A from communicating with an operating entity 170B, or with the wireless infrastructure supporting operating entity 170B, or vice versa. Thus, as illustrated in FIG. 1 by arrows, operating entities 170A may be capable of communicating with each other either directly or via a wireless infrastructure (represented in FIG. 1 by access point 160A) also capable of communicating using the same RAT; whereas operating entities 170B may be capable only of communicating with each other and with their corresponding wireless infrastructure 160B. Generally, in these examples, it is assumed that the operating entities are each capable of communicating amongst themselves, e.g. in the case of vehicles, that they are all V2V capable, although they may be restricted to a single RAT. It may be noted that in some cases, not all operating entities 170A or 170B may be able to communicate with their like entities 170A or 170B due to, for example, physical constraints. For example, successful transmission between two entities 170B may not be possible due to the positions of their antennas, or obstructions.

A further entity, referred to as an interworking unit 190, is equipped with a communication system enabling wireless communication using more than one RAT, which may include using a single RAT with different versions. As one example, the communication system may be capable of using LTE Release 14 (LTE R14) and LTE Release 15 (LTE R15) as the first and second V2X RATs. These two versions of the same RAT have incompatibilities for V2X operation and require special handling as captured in 3GPP TS 36.331. In the example of FIG. 1, the interworking unit 190 is depicted as a stationary system capable of communicating with the respective wireless infrastructures 160A, 160B and through the infrastructures, with the operating entities 170A, 170B. The interworking unit 190, as discussed below, can receive messages transmitted using the first RAT from a one or more operating entities 170A, and convert the messages (e.g., by reformatting) to be compatible with the second RAT (or convert messages from one version or release of a single RAT to an alternative version or release, e.g. from LTE R15 to LTE R14), for transmission to one or more operating entities 170B. The interworking unit 190 thus provides an interworking function that enables simultaneous access by operating entities, and other entities in the system, to a multiplicity of RATs.

In the specific example embodiments described below, the operating entities 170A, 170B are depicted as ground vehicles capable of executing a platooning application; thus, for the purpose of describing these embodiments, it is presumed that the entities of FIG. 1 are platoon entities, in that they may be comprised in, or be associated with, a platoon. It is also presumed that operating entities 170A, 170B are ground vehicles and that the RATs employed are V2X RATs, and will generally be referred to as such in the examples below. The V2X RATs may be selected from V2X systems currently available or available in the future, such as, but not limited to, ETSI ITS, SAE DSRC, and SAE C-V2X. The configuration and management of platoons, including messaging protocols, will thus be understood by those skilled in the art.

In such scenarios, platoons may be controlled by platoon management entities (PMEs), which determine and transmit platoon control and management messages to other entities within and outside the managed platoon. The PMEs as depicted in the accompanying drawings is an external computing system 120, 130, communicating over a public or private wide area network 100 with their respective wireless infrastructures represented schematically as 160A, 160B (it will be appreciated that other network entities, such as gateway systems and the like, are omitted for ease of exposition). The PME may be a single computing system as illustrated by 120, 130, or may reside in a set of networked servers (e.g., a cloud service), as illustrated by service 150. In some V2X implementations, the PME may be comprised in or be co-located with an RSU. The PMEs 120, 130 in this example topology communicate with the interworking unit 190 over the network 100. Of course, it will be appreciated that suitable encryption and authentication protocols may be used in communications between any entities in the system to ensure safety and security. Further, some vehicles 170A, 170B, in addition to being equipped for V2V communication, may also be capable of communicating with server systems such as 150 over the network 100, for example over a cellular radio network (e.g. a 4G/LTE network or a 5GNR network), or over a WLAN (e.g., IEEE 802.11p/802.11bd network).

It will be appreciated by those skilled in the art that the PME may instead be resident in a vehicle of the platoon, for example the lead vehicle or the interworking unit 190. In the accompanying drawings, the PME is depicted as a separate unit, but it will be understood that if the PME is resident in a vehicle of the platoon, or in the interworking unit 190, communications between the PME and that vehicle or the PME and the interworking unit may not be necessary, and may be omitted from the examples discussed below. In other words, in the messaging diagrams discussed below for example, a communication with between PME 120 and the interworking unit 190 should not be construed as limiting communication to a non-vehicular PME even if depicted as such. A communication between a PME 120 and an interworking unit 190 may represent a communication between the lead vehicle of a platoon (e.g., a vehicle 170A) in which the PME resides, and the interworking unit 190, even if not expressly depicted as a vehicle. Modification of the concepts described below will be within the ability of the person skilled in the art.

Figure 2:
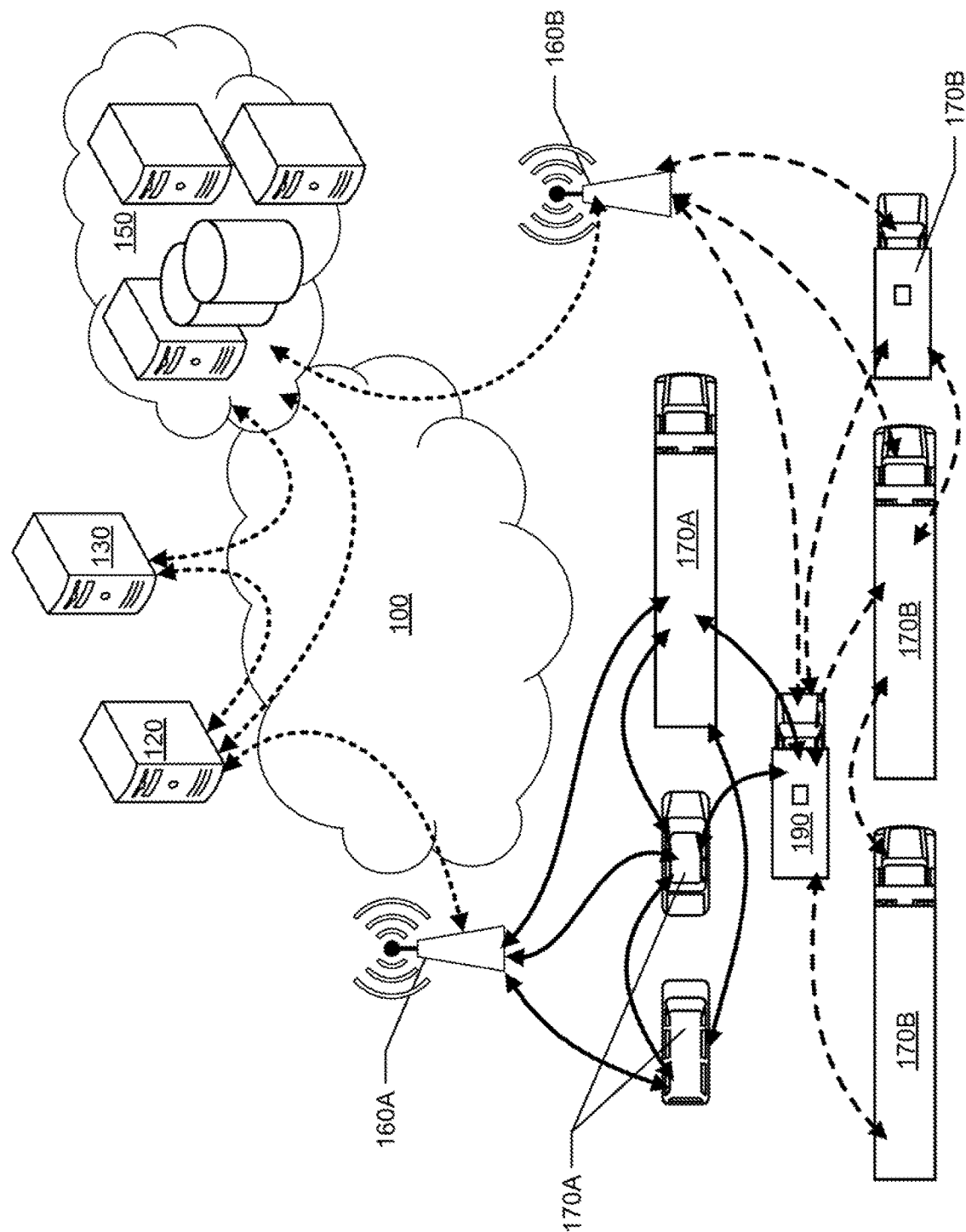
FIG. 2 is a variation of the example topology of FIG. 1.

Further, in the context of V2X communication, the interworking unit 190 may reside in a vehicle rather than a stationary component. FIG. 2 illustrates a variant of the system of FIG. 1, in which the interworking unit 190 is comprised in a vehicle, which is therefore capable of communicating with vehicles 170A and 170B, using their respective V2X RATs, and with their respective wireless infrastructures 170A, 170B. The interworking unit 190 may thus be in direct contact with the PME and exchange messages directly with the PME (e.g., where the PME resides in a vehicle, such as a lead vehicle of the set of vehicles 170A) and/or indirect contact with the PME (e.g., where the PME resides in a vehicle, but obstacles or interference prevent direct communication between the PME and the interworking unit; or where the PME resides in a stationary component). Not all possible communication paths (vehicle-to-vehicle or vehicle-to-infrastructure) are depicted in FIG. 2. As a further example, the interworking unit 190 may be comprised in, or co-located with, an RSU. Again, the examples discussed below should not be considered limiting, even where the interworking unit 190 is depicted as separate from other vehicles. For example, communication between a PME 120 and the interworking unit 190 may comprise vehicle-to-vehicle communication, even if not depicted as such.

Figure 3:
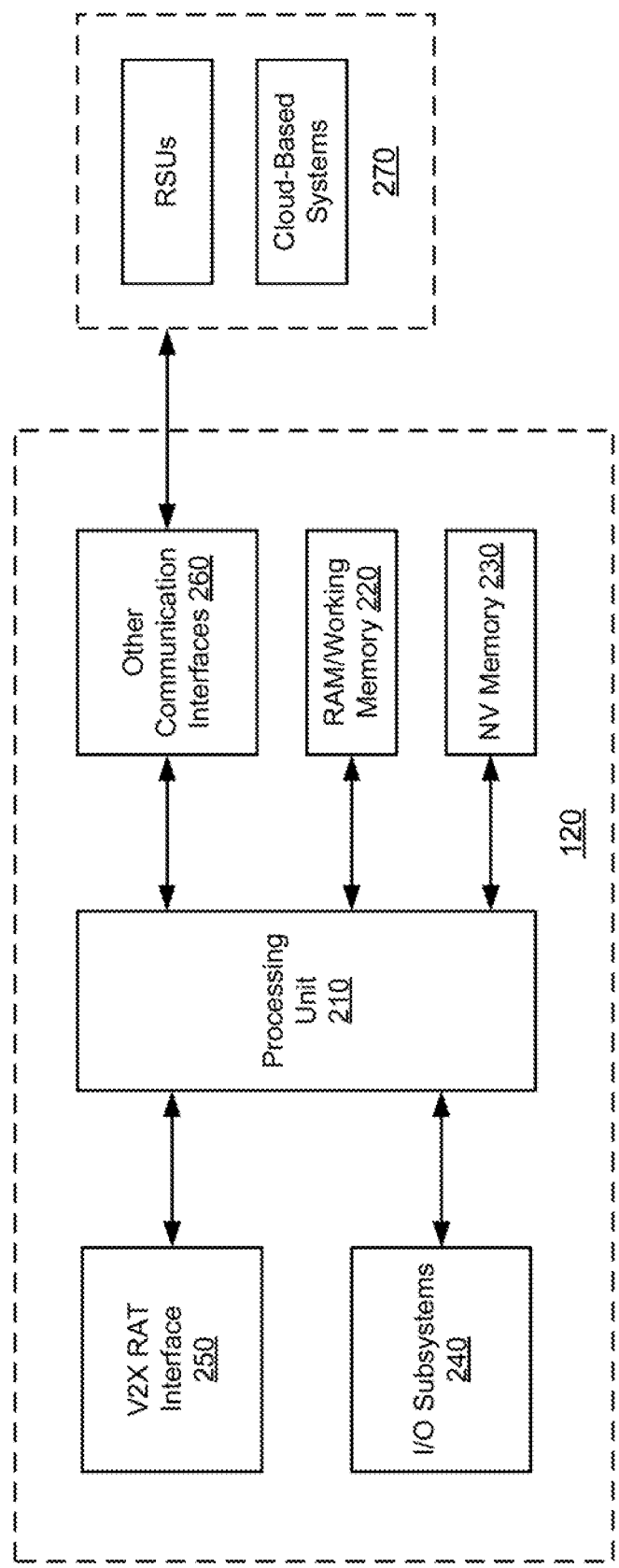
FIG. 3 is a schematic diagram illustrating a stationary computing system for use in the system of FIGS. 1 and 2.

FIG. 3 is a schematic representation of select functional components of an example PME 120, whether it resides in a stationary computing system or in a vehicle. The PME 120 is a data processing system that includes one or more microprocessors, as represented by the processing unit 210; volatile (RAM/working memory) 220 and non-volatile (NV) memory 230; and various input/output (I/O) subsystems 240 including human-machine interfaces (e.g., display screens, touchscreens, keyboards, pointing devices, and the like). These human-machine interfaces may be optional, as the PME 120 may be accessed remotely via a short range communication (e.g. Bluetooth™, Near Field Communications, ZigBee™, IEEE 802.15, Ethernet, WLAN, etc.) connection via a communication interface 260. The PME 120 is also provided with at least one V2X RAT interface 250, which may include transceiver, digital signal processing, and control circuitry, together with one or more antennas, not illustrated in FIG. 3, if the PME 120 is capable of wireless communication, as in the case where it resides in a vehicle. Alternatively, the PME 120 may receive and transmit V2X messages through a gateway, not shown, using another communication interface 260. The PME 120 may also communicate with external systems, such as cloud-based server systems and RSUs, via the other communication interfaces 260. It will be understood by those skilled in the art that the components illustrated in FIG. 3 are merely representative of particular aspects of the PME 120, and that other components typically included in such a system, such as a power supply, buses, and other components, have been omitted from the drawings and description only for succinctness.

Figure 4:
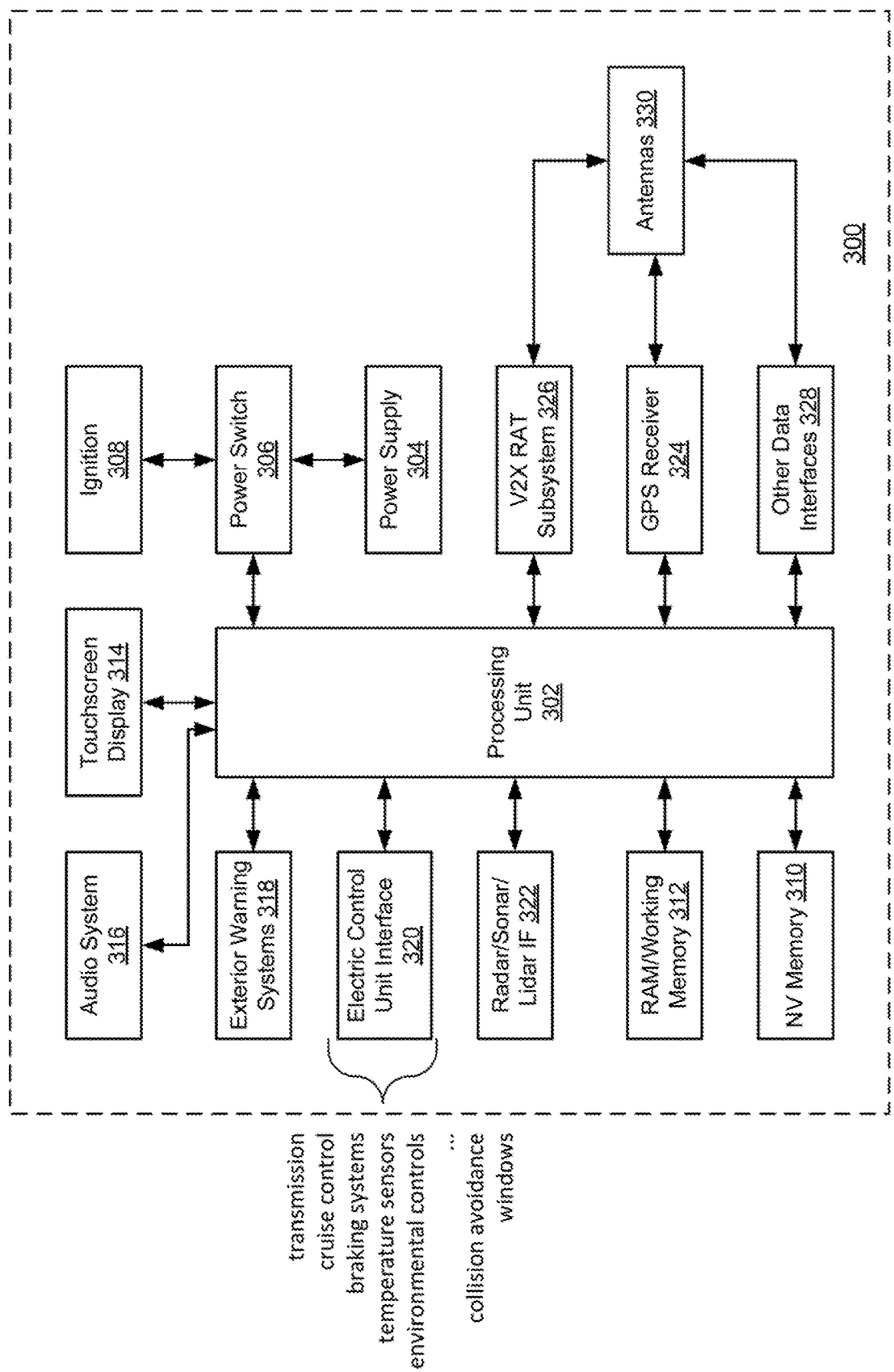
FIG. 4 is a schematic diagram of select components of a V2X-enabled vehicle.

FIG. 4 is a schematic representation of an in-vehicle communication system 300, including a communication system for a V2X-enabled vehicle such as vehicles 170A and 170B. This in-vehicle system may be built into the vehicle in an on-board unit that interfaces with other control and monitoring circuitry of the vehicle. One or more microprocessors (processing unit 302) control operation of the system 300. Data may be stored in either volatile 312 or non-volatile (NV) 310 memory. The system 300 executes an operating system and various applications (not shown) as required, for example a platooning application to participate in platoons with other vehicles, and/or autonomous or semi-autonomous driving. The processor unit 302 interfaces with typical elements of a transport vehicle, such as an interior touchscreen display 314 and audio system 316, and exterior warning system 318 and signaling features (e.g., hazard lights, headlights, sirens, horns). The processor unit 302 may also be provided with an interface with one or more of the various electronic control units 320 in a typical vehicle controlling various functions, such as the transmission, cruise control, braking systems, temperature sensors, environmental controls (e.g. heating, cooling), collision avoidance, power windows, and the like. The processing unit 302 may be configured to obtain sensor and status data from one or more of these control units—for example speed, acceleration, engine temperature, and so on—which may be transmitted to a PME 120 or other supervisory entity, or used by an autonomous or semi-autonomous application executed by the system 300 to control the vehicle. Similarly, the processing unit may also be interfaced with a power switch 306 controlling a power supply 304 and the vehicle ignition 308. The status of these components may also be collected by the processing unit 302. The processing unit in the vehicle includes interfaces for various sensors and monitoring systems in the vehicle, including radar, sonar, and/or lidar systems 322; a GPS receiver 324, and a V2X RAT communication subsystem 326 configured to operate in accordance with a given V2X RAT technology and version (e.g., ETSI ITS). The system 300 may be provided with other wired or wireless data interfaces 328 as well (e.g., a Universal Serial Bus (USB) port, WLAN communication subsystem). Wireless communication subsystems are of course provided with antennas 330, as well as any required transceivers, digital signal processors (DSPs), and control circuitry.

Figure 5:
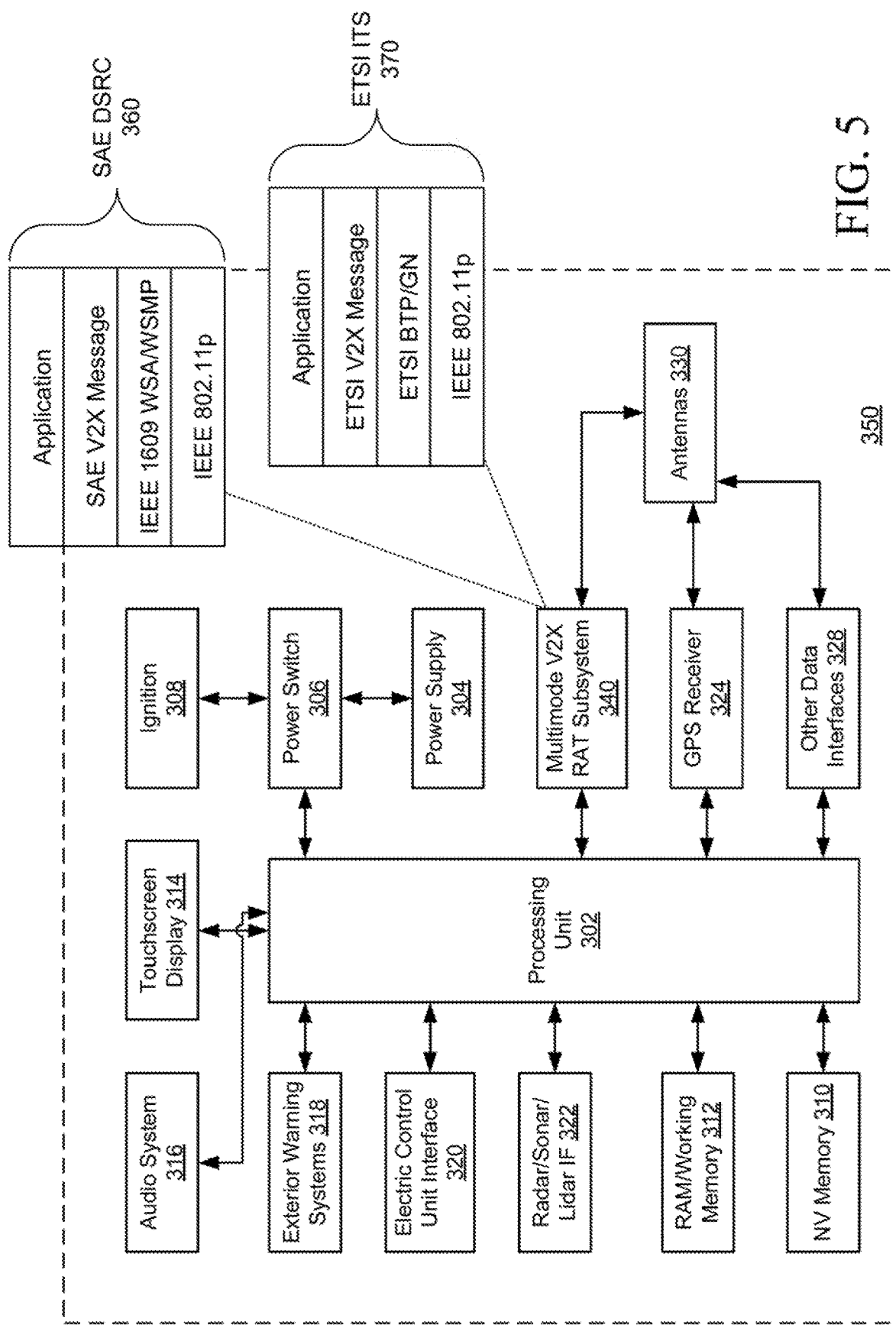
FIG. 5 is a schematic diagram of select components of an interworking unit such as a vehicle.

An interworking in-vehicle communication system 350 capable of providing the interworking function is depicted in FIG. 5. This example also contemplates that the system 350 is built into a vehicle, and includes many of the same features as the system 300 of FIG. 4. However, rather than a single-mode V2X RAT subsystem, the interworking system 350 includes a multimode V2X RAT subsystem 340 that is capable of transmitting and receiving messages compatible with multiple (at least two) V2X RATs. Depending on which RATs are implemented, the subsystem 340 may be provided with multiple antennas 330, transceivers, DSPs, and control circuitry as required; but in some implementations, using the same physical communication protocol, these elements may not need to be duplicated. In this example, the multimode V2X RAT subsystem implements both the SAE DSRC 360 and ETSI ITS 370 protocol stacks. When a message is received in accordance with a first V2X RAT, the multimode subsystem 340 decodes the message and determines its handling. For example, if the message is addressed to the interworking unit 190 (e.g., an instruction to commence interworking, or an invitation to join a platoon), the subsystem 340 may pass the message to the processing unit 302 for processing and execution. On the other hand, if the message is a broadcast message or addressed to another vehicle using a different RAT, the subsystem 340 may extract the message and repackage it (e.g., by reformatting the message or content values) in accordance with the other RAT, and transmit the reformatted message for receipt by an intended destination.

The V2X RAT subsystem 340 may implement the interworking function with or without the processing unit 302. In some examples, the V2X RAT subsystem 340 may be included in a system-on-chip including sufficient processing capacity to implement the interworking function without relying on the processing unit 302. Furthermore, it should be noted that while the communication systems 300, 350 were depicted as on-board units installed in a vehicle including other features, the communication system 300, 350 may be provided as a separate component from the processor unit 302, radar/sonar/lidar interface 322, and so on. For example, the interworking communication system consisting of the multimode V2X RAT subsystem with a dedicated processor may be provided as a plug-in component or card to be installed in a vehicle that is already provisioned with the other elements depicted in FIG. 5. Further, the interworking communication system, with or without the additional components, may be provided in a portable wireless device that is capable of interfacing with various on-board vehicle sensors and control systems.

Figure 6:
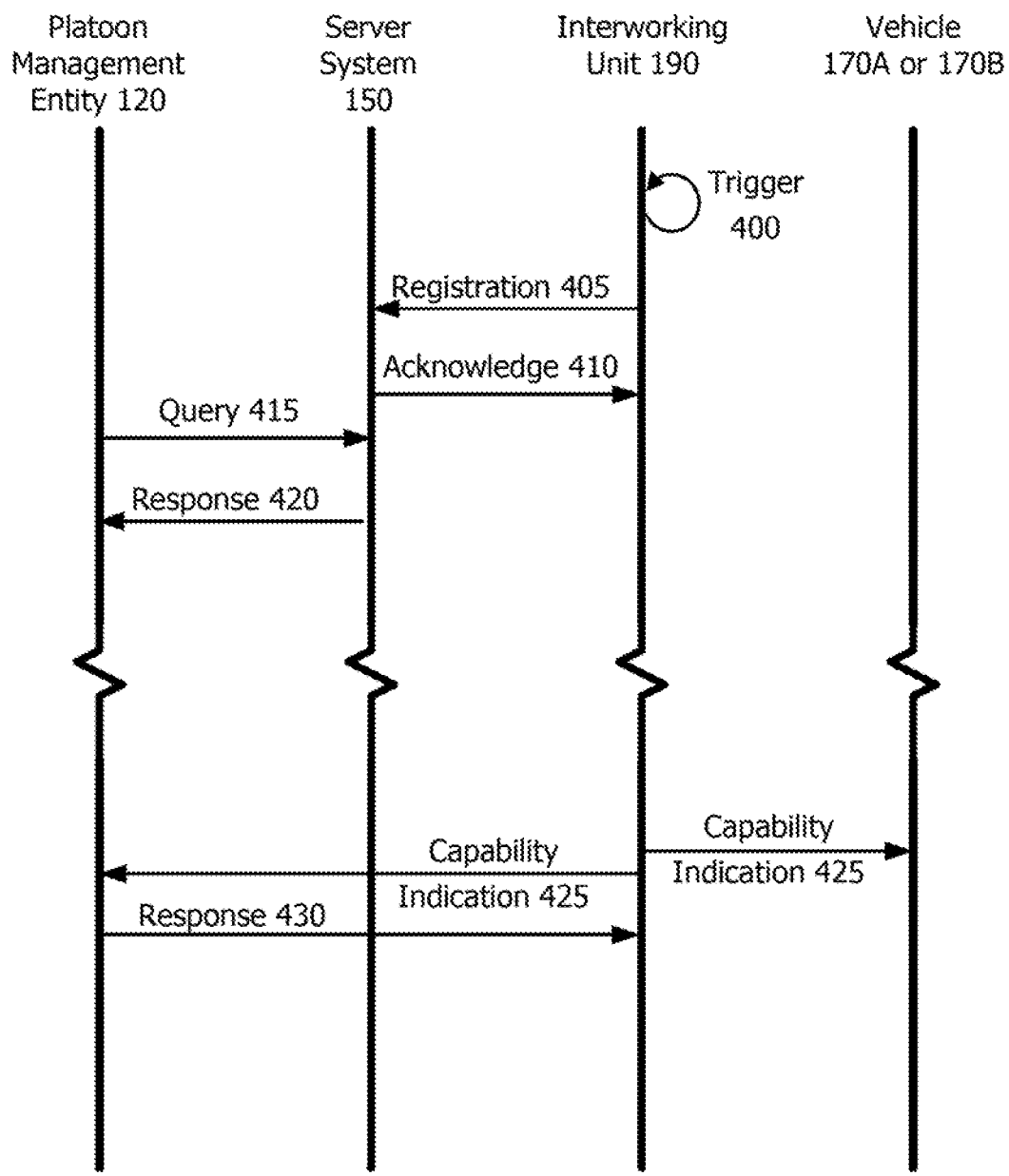
FIG. 6 is a messaging diagram illustrating advertisement of interworking functions.

FIG. 6 illustrates different examples of interworking unit 190 advertisement of its interworking capabilities. As a first example, when the interworking unit 190 registers itself with a registration database or server system (such as the server system 150) by sending a registration message 405 using at least one V2X RAT over the network 100, its capabilities are included in an indication in its registration information along with identifying information. Identifying information can include one or more of a digital certificate, an International Mobile Equipment Identity (IMEI), IMEI with software version (IMEI-SV), an International Mobile Subscriber Identity (IMSI), or some other suitable identifier. The interworking capabilities included in the registration message may include an identification of the specific V2X RATs supported by the interworking unit 190, and optionally an indication whether the interworking unit 190 is currently providing the interworking function and/or its geographic location. If the interworking unit 190 is a vehicle that is currently a member of a platoon, the identifying information may also include an identifier for the platoon, and optionally information about the position of the interworking unit 190 in the platoon. Identifying information for a platoon may be an alphanumeric identifier.

Optionally, registration by the interworking unit 190 may be triggered by an event, as indicated by trigger 400. For example, the interworking unit 190 may be triggered to register itself with the server system 150 upon arrival at a predetermined location (e.g., an embarkation yard), or when a vehicle comprising the interworking unit 190 is ready to join a platoon. For example, sensors in a transport vehicle may detect when a container has been attached, or when the fuel tank has been filled. This event may trigger the interworking unit 190 registering with the server system 150. The registration system (e.g. server system 150) may respond with configuration instructions, for example whether the interworking unit 190 is to be configured to make interworking functions available or not.

The interworking capability of the interworking unit 190 may thus be recorded by the server system 150, and an acknowledgment message 410 is returned. Subsequently, a PME 120 that is assembling a platoon, or currently controlling a platoon, may become aware of the interworking unit 190 by querying 415 the server system 150 for nearby or available vehicles or interworking units. The response 420 from the server system 150 can include an indication of the availability of the interworking unit 190. Subsequently, the PME 120 may request the interworking unit 190 to provide an interworking function and/or join the platoon as discussed below.

Alternatively or additionally, the interworking unit 190 may advertise its capabilities by transmitting 425 its identifying information and indication, for example in a capability indication message of interworking capabilities, as described above, to multiple vehicles 170A, 170B or PMEs 120 within communications range, using one or more of the V2X RATs that it supports. Generally, depending on the particular V2X protocol employed, such transmissions may or may not receive a response 430; in some cases, a receiving vehicle or PME may only transmit a response if it has determined that it is "interested" in the interworking feature, for example if it is a PME that has determined that it is able to expand its platoon.

As another example, not illustrated in FIG. 6, advertisement of the interworking unit 190's capabilities may not be transmitted directly by the interworking unit 190. Rather, if the interworking unit 190 has joined a platoon and indicated its interworking capabilities to the PME 120, the PME 120 or another vehicle in the platoon may instead transmit messages to recipients (other platoon entities, or entities outside the platoon) to announce the availability of an interworking function.

As mentioned above, the indication sent by the interworking unit 190 may be sent using one or more of the V2X RATs that the interworking unit 190 supports. As an example, an existing messaging protocol (e.g. IEEE 1609.2 messaging, ETSI BTP/GN messaging, IEEE 1609 WSA and WSMP messaging, CAM messaging, etc) may be adapted to include pertinent data. Tables 1 to 4 below show example modifications that may be made to some existing protocols to provide an indication whether the sender of the message currently has an interworking function active and what V2X technologies are supported. Table 1 illustrates the example modifications/updates to the MIB in IEEE 802.11bd, for different V2X technologies at a higher level perspective; Table 2 illustrates the example modifications/updates to MIB in IEEE 802.11bd for different V2X technologies at a lower level (more precisely identifying V2X messaging protocols).

TABLE 1

Example modification to MAC and PHY MIB in IEEE 802.11bd for different V2X technologies.

In the dotStationConfig TABLE of Annex D, add the following to the base of the dot11StationConfigEntry sequence list as follows:
Dot11StationConfigEntry ::=
SEQUENCE {
. . .
   dot11V2XinterworkingActive TruthValue,
   dot11V2XtechnologySupportedETSIITS TruthValue,
   dot11V2XtechnologySupportedSAEDSRC TruthValue,
   dot11V2XtechnologySupportedSAECV2X TruthValue }

TABLE 2

Further example modification to MAC and PHY MIB in IEEE 802.11bd for different V2X technologies.

In the dotStationConfig TABLE of Annex D, add the following to the base of the dot11StationConfigEntry
sequence list as follows:
Dot11StationConfigEntry ::=
SEQUENCE {
. . .
   dot11V2XinterworkingActive TruthValue,
   dot11V2XtechnologySupportedR14LTEPC5 TruthValue,
   dot11V2XtechnologySupportedR15LTEPC5 TruthValue,
   dot11V2XtechnologySupportedR16NRPC5 TruthValue,
   dot11V2XtechnologySupportedETSIBTPGN TruthValue,
   dot11V2XtechnologySupportedIEEE16093 TruthValue }

Tables 3 and 4 illustrate the example modifications/additions to ETSI Cooperative Awareness Messaging (CAM), as set out in ETSI EN 302 637-2, Annex A. Some unchanged content is redacted for brevity. Table 3 sets out information at a higher level, while Table 4 sets out more precise details. Again, both include an indication whether the sender of the message currently has an interworking function active.

TABLE 3

Example modification to ETSI CAM messaging in ETSI EN 302 637-2 for different V2X technologies.

CAM-PDU-Descriptions {
itu-t (0) identified-organization (4) etsi (0) itsDomain (5) wg1 (1)
en (302637) cam (2) version (2)
}

TABLE 3-continued

Example modification to ETSI CAM messaging in ETSI
EN 302 637-2 for different V2X technologies.

```
DEFINITIONS AUTOMATIC TAGS ::=
BEGIN
IMPORTS
. . .
BasicContainer ::= SEQUENCE {
    stationType StationType,
    referencePosition ReferencePosition,
    . . .,
    v2XinterworkingVehicleIndication V2XinterworkingVehicleIndication
}
. . .
RSUContainerHighFrequency ::= SEQUENCE {
    protectedCommunicationZonesRSU ProtectedCommunicationZonesRSU
OPTIONAL,
    . . .
}
V2XinterworkingVehicleIndication ::= SEQUENCE {
    interworkingActivated                NULL OPTIONAL,
    supportedV2XiwTechnologiesAndCapabilities
    V2XiwTechnologiesAndCapabilitres,
    . . .
}
V2XiwTechnologiesAndCapabilities ::= SEQUENCE {
    ETSI-ITS                    NULL OPTIONAL,
    SAE-DSRC                    NULL OPTIONAL,
    SAE-C-V2X                    NULL OPTIONAL,
    . . .
}
GenerationDeltaTime ::= INTEGER { oneMilliSec(1) } (0..65535)
END
```

TABLE 4

Further example modification to ETSI CAM messaging in
ETSI EN 302 637-2 for different V2X technologies.

```
CAM-PDU-Descriptions {
itu-t (0) identified-organization (4) etsi (0) itsDomain (5) wg1 (1)
en (302637) cam (2) version (2)
}
DEFINITIONS AUTOMATIC TAGS ::=
BEGIN
IMPORTS
. . .
BasicContainer ::= SEQUENCE {
    stationType StationType,
    referencePosition ReferencePosition,
    . . .,
    v2XinterworkingVehicleIndication V2XinterworkingVehicleIndication
}
. . .
RSUContainerHighFrequency ::= SEQUENCE {
    protectedCommunicationZonesRSU ProtectedCommunicationZonesRSU
OPTIONAL,
    . . .
}
V2XinterworkingVehicleIndication ::=        SEQUENCE {
    interworkingActivated                NULL OPTIONAL,
    supportedV2XiwTechnologiesAndCapabilities
    V2XiwTechnologiesAndCapabilities,
    . . .
}
V2XiwTechnologiesAndCapabilities ::=        SEQUENCE {
    v2XiwTechnologies            V2XiwTechnologies OPTIONAL,
    v2XiwCapabilities            V2XiwCapabilities OPTIONAL,
    . . .
}
V2XiwTechnologies ::=                SEQUENCE {
    r14LTEPC5                NULL OPTIONAL,
    r15LTEPC5                NULL OPTIONAL,
    r16NRPC5                NULL OPTIONAL,
    IEEE802-11p                NULL OPTIONAL,
        IEEE802-11bd                NULL OPTIONAL,
```

TABLE 4-continued

Further example modification to ETSI CAM messaging in
ETSI EN 302 637-2 for different V2X technologies.

```
    . . .
}
V2XiwCapabilities ::=          SEQUENCE {
    ETSIBTP-GN                 NULL OPTIONAL,
    IEEE1609-3                 NULL OPTIONAL,
    . . .
}
GenerationDeltaTime ::= INTEGER { oneMilliSec(1) } (0..65535)
END
```

Table 5 sets out an example messaging modification to IEEE 1609.3 to indicate support for different V2X technologies and to indicate whether the sender of the message currently has an interworking function active. Table 6 sets out the values and descriptions for the Capability sub-field in Table 5. Tables 7 and 8 set out a more detailed modification to IEEE 1609.3, with more robust details concerning V2X RAT support set out in the Capability sub-field.

TABLE 5

Example interworking indication modification for IEEE 1609.3.

| | WAVE Element ID = 9 | Length | Capability | Information (optional) |
|---|---|---|---|---|
| Octets | 1 | 1 | 2 | variable |

TABLE 6

Sub-field format for Capability octets of Table 5.

| Bitmap value | Description |
|---|---|
| Bit 0 (MSB) | ETSI-ITS supported |
| Bit 1 | SAE-DSRC supported |
| Bit 2 | SAE-CV2X supported |
| Bit 3-15 | Reserved |

TABLE 7

Example interworking indication modification for IEEE 1609.3.

| | WAVE Element ID = 10 | Length | Capability | Information (optional) |
|---|---|---|---|---|
| Octets | 1 | 1 | 4 | variable |

TABLE 8

Sub-field format for Capability octets of Table 7.

| Bitmap value | Description |
|---|---|
| Bit 0 (MSB) | R14 LTE PC5 supported |
| Bit 1 | R15 LTE PC5 supported |
| Bit 2 | R16 NR PC5 supported |
| Bit 3 | ETS IBT PGN supported |
| Bit 4 | IEEE 1609.3 supported |
| Bit 5-31 | Reserved |

Tables 9 and 10 set out example modifications to the Radio Resource Control (RRC) protocol as used on the PC5 interface specified by 3GPP TS 36.331 (subclause 6.3.8, Sidelink information elements) to indicate what V2X RATs are supported and whether interworking is currently active. Again, the second table, Table 10, sets out more detailed support information for the interworking function.

TABLE 9

Example modification to sidelink information in RRC protocol as defined in 3GPP TS 36.331.

```
6.3.8           Sidelink information elements
. . .
-               SL-V2XinterworkingVehicleIndication
The IE SL-V2XinterworkingVehicleIndication indicates information relating to a UE's
capability of V2X technology interworking.
                SL-V2XinterworkingVehicleIndication information element
-- ASN1START
SL-V2XinterworkingVehicleIndication-r15 ::=     SEQUENCE {
    interworkingActivated-r15                   BOOLEAN,
    supportedV2XiwTechnologiesAndCapabilities-r15 SL-
iwTechnologiesAndCapabilities-r15,
    . . .
}
SL-iwTechnologiesAndCapabilities-r15 ::=        SEQUENCE {
    ETSI-ITS-r15                                ENUMERATED {supported}
    OPTIONAL,
    SAE-DSRC-r15                                ENUMERATED {supported}
    OPTIONAL,
    SAE-C-V2X-r15                               ENUMERATED {supported}
    OPTIONAL,
```

TABLE 9-continued

Example modification to sidelink information in RRC protocol as defined in 3GPP TS 36.331.

```
    . . .
}
-- ASN1STOP
```

SL-V2XinterworkingVehicleIndication field descriptions interworkingActivated
Indicates whether the source UE is currently performing V2X interworking between two or more V2X technologies
ETSI-ITS
Indicates support by the sender the capability of interworking to and from ETSI ITS V2X technology.
SAE-DSRC
Indicates support by the sender the capability of interworking to and from SAE DSRC V2X technology.

TABLE 10

Example modification to sidelink information in RRC protocol as defined in 3GPP TS 36.331.

```
6.3.8              Sidelink information elements
. . .
-                  SL-V2XinterworkingVehicleIndication
The IE SL-V2XinterworkingVehicleIndication indicates information relating to a UE's
capability of V2X technology interworking.
                   SL-V2XinterworkingVehicleIndication information element
-- ASN1START
SL-V2XinterworkingVehicleIndication-r15 ::= SEQUENCE {
    interworkingActivated              BOOLEAN,
    supportedV2XiwTechnologiesAndCapabilities SL-
iwTechnologiesAndCapabilities-r15,
    . . .
}
SL-iwTechnologiesAndCapabilities-r15 ::=  SEQUENCE {
    v2XiwTechnologies                  SL-V2XiwTechnologies-r15
    OPTIONAL,
    v2XiwCapabilitres                  SL-V2XiwCapabilities-r15
    OPTIONAL,
    . . .
}
SL-V2XiwTechnologies-r15 ::=           SEQUENCE {
    r14LTEPC5-r15                      ENUMERATED {supported}
    OPTIONAL,
    r15LTEPC5-r15                      ENUMERATED {supported}
    OPTIONAL,
    r16NRPC5-r15                       ENUMERATED {supported}
    OPTIONAL,
    IEEE802-11p-r15                         ENUMERATED {supported}
    OPTIONAL,
      IEEE802-11bd-r15                 ENUMERATED {supported}
    OPTIONAL,
    . . .
}
SL-V2XiwCapabilities-r15 ::=           SEQUENCE {
    ETSIBTP-GN-r15                     ENUMERATED {supported}
    OPTIONAL,
    IEEE1609-3-r15                     ENUMERATED {supported}
    OPTIONAL,
    . . .
}
-- ASN1STOP
```

SL-V2XinterworkingVehicleIndication field descriptions interworkingActivated
Indicates whether the source UE is currently performing V2X interworking between two
or more V2X technologies
r14LTEPC5
Indicates support by the sender the capability of interworking to and from Rel-14 LTE-
based PC5.
r15LTEPC5
Indicates support by the sender the capability of interworking to and from Rel-15 LTE-
based PC5.
r16NRPC5
Indicates support by the sender the capability of interworking to and from Rel-16 NR-
based PC5.
IEEE802-11p

TABLE 10-continued

Example modification to sidelink information
in RRC protocol as defined in 3GPP TS 36.331.

Indicates support by the sender the capability of interworking to and from IEEE 802.11p.
IEEE802-11bd
Indicates support by the sender the capability of interworking to and from IEEE 802.11bd.
ETSIBTP-GN
Indicates support by the sender the capability of interworking to and from ETSI BTP/GN.
IEEE1609-3-2010
Indicates support by the sender the capability of interworking to and from IEEE 1609.3-2010

Tables 11 and 12 set out example modifications to the RRC protocol as used on the Uu interface as defined in 3GPP TS 36.331, again indicating what V2X RATs are supported and whether interworking is currently active, and where Table 12 sets out support in greater detail.

TABLE 11

Example modification to the RRC protocol as used on the Uu interface as defined in 3GPP TS 36.331.

```
6.3.6                                    Other information elements
...
-                                        UE-EUTRA-Capability
The IE UE-EUTRA-Capability is used to convey the E-UTRA UE Radio Access Capability
Parameters, see TS 36.306, and the Feature Group Indicators for mandatory features (defined
in Annexes B.1 and C.1) to the network. The IE UE-EUTRA-Capability is transferred in E-
UTRA or in another RAT.
                  NOTE 0:   For (UE capability specific) guidelines on the use of keyword OPTIONAL, see
                                         Annex A.3.5.
                                         UE-EUTRA-Capability information element
-- ASN1START
UE-EUTRA-Capability ::=                          SEQUENCE {
                  accessStratumRelease           AccessStratumRelease,
                  ue-Category                    INTEGER (1..5),
                  pdcp-Parameters                    PDCP-Parameters,
                  phyLayerParameters                 PhyLayerParameters,
                  rf-Parameters                  RF-Parameters,
                  measParameters                 MeasParameters,
                  featureGroupIndicators             BIT STRING (SIZE (32))
                                                     OPTIONAL,
                  interRAT-Parameters                SEQUENCE {
                                 utraFDD            IRAT-ParametersUTRA-FDD
                                                     OPTIONAL,
                                 utraTDD128         IRAT-ParametersUTRA-TDD128
                                                     OPTIONAL,
                                 utraTDD384         IRAT-ParametersUTRA-TDD384
                                                     OPTIONAL,
                                 utraTDD768         IRAT-ParametersUTRA-TDD768
                                                     OPTIONAL,
                                 geran          IRAT-ParametersGERAN              OPTIONAL,
                                 cdma2000-HRPD   IRAT-ParametersCDMA2000-HRPD
                                                     OPTIONAL,
                                 cdma2000-1xRTT  IRAT-ParametersCDMA2000-1XRTT
                                                     OPTIONAL
                  },
                  nonCriticalExtension           UE-EUTRA-Capability-v920-IEs
                                                     OPTIONAL
}
-- Late non critical extensions
UE-EUTRA-Capability-v9a0-IEs ::=                 SEQUENCE {
                  featureGroupIndRel9Add-r9      BIT STRING (SIZE (32))
                                                     OPTIONAL,
                  fdd-Add-UE-EUTRA-Capabilitres-r9               UE-EUTRA-CapabilityAddXDD-Mode-
                                                 r9    OPTIONAL,
                  tdd-Add-UE-EUTRA-Capabilities-r9               UE-EUTRA-CapabilityAddXDD-Mode-
                                                 r9    OPTIONAL,
                  nonCriticalExtension           UE-EUTRA-Capability-v1500-IEs
                                                     OPTIONAL
}
```

TABLE 11-continued

Example modification to the RRC protocol as used on the Uu interface as defined in 3GPP TS 36.331.

```
UE-EUTRA-Capability-v1500-IEs ::= SEQUENCE {
                phyLayerParameters-v1500        PhyLayerParameters-v1500,
...
                mbms-Parameters-v1500           MBMS-Parameters-v1500
                                                OPTIONAL,
                sl-Parameters-v1500             SL-Parameters-v1500
                                                OPTIONAL,
        ...OPTIONAL
}
SL-Parameters-v1500 ::=                         SEQUENCE {
                sl-v2xinterworkingVehicleIndication-r15 SL-
                                                V2XinterworkingVehicleIndication-r15
                                                OPTIONAL
}
SL-V2XinterworkingVehicleIndication-r15 ::=                     SEQUENCE {
                interworkingActivated-r15                       BOOLEAN,
                supportedV2XiwTechnologiesAndCapabilities-r15 SL-
iwTechnologiesAndCapabilities-r15,
                ...
}
SL-iwTechnologiesAndCapabilities-r15 ::=                        SEQUENCE {
                ETSI-ITS-r15                                    ENUMERATED {supported}
                OPTIONAL,
                SAE-DSRC-r15                                    ENUMERATED {supported}
                OPTIONAL,
                SAE-C-V2X-r15                                   ENUMERATED {supported}
                OPTIONAL,
                ...
}
-- ASN1STOP
```

SL-V2XinterworkingVehicleIndication
Indicates information relating to a UE's capability of V2X technology interworking.
interworkingActivated
Indicates whether the source UE is currently performing V2X interworking between two or more V2X technologies
ETSI-ITS
Indicates support by the sender the capability of interworking to and from ETSI ITS V2X technology.
SAE-DSRC
Indicates support by the sender the capability of interworking to and from SAE DSRC V2X technology.

TABLE 12

Example modification to the RRC protocol as used on the Uu interface as defined in 3GPP TS 36.331.

6.3.6           Other information elements
...
-               UE-EUTRA-Capability
The IE UE-EUTRA-Capability is used to convey the E-UTRA UE Radio Access Capability Parameters, see TS 36.306, and the Feature Group Indicators for mandatory features (defined in Annexes B.1 and C.1) to the network. The IE UE-EUTRA-Capability is transferred in E-UTRA or in another RAT.
        NOTE 0: For (UE capability specific) guidelines on the use of keyword OPTIONAL, see
                Annex A.3.5.
                        UE-EUTRA-Capability information element

```
-- ASN1START
UE-EUTRA-Capability ::=         SEQUENCE {
        accessStratumRelease    AccessStratumRelease,
        ue-Category             INTEGER (1..5),
        pdcp-Parameters         PDCP-Parameters,
        phyLayerParameters      PhyLayerParameters,
        rf-Parameters           RF-Parameters,
        measParameters          MeasParameters,
        featureGroupIndicators  BIT STRING (SIZE (32))
                                        OPTIONAL,
        interRAT-Parameters     SEQUENCE {
            utraFDD                     IRAT-ParametersUTRA-FDD
                                                OPTIONAL,
            utraTDD128                  IRAT-ParametersUTRA-TDD128
                                                OPTIONAL,
            utraTDD384                  IRAT-ParametersUTRA-TDD384
                                                OPTIONAL,
```

TABLE 12-continued

Example modification to the RRC protocol as used on the Uu interface as defined in 3GPP TS 36.331.

```
            utraTDD768              IRAT-ParametersUTRA-TDD768
                                        OPTIONAL,
            geran                   IRAT-ParametersGERAN              OPTIONAL,
            cdma2000-HRPD           IRAT-ParametersCDMA2000-HRPD
                                        OPTIONAL,
            cdma2000-1xRTT          IRAT-ParametersCDMA2000-1XRTT
                                        OPTIONAL
        },
        nonCriticalExtension        UE-EUTRA-Capability-v920-IEs
                                        OPTIONAL
}
-- Late non critical extensions
UE-EUTRA-Capability-v9a0-IEs ::=            SEQUENCE {
        featureGroupIndRel9Add-r9       BIT STRING (SIZE (32))
                                        OPTIONAL,
        fdd-Add-UE-EUTRA-Capabilities-r9                UE-EUTRA-CapabilityAddXDD-Mode-
                                    r9      OPTIONAL,
        tdd-Add-UE-EUTRA-Capabilities-r9                UE-EUTRA-CapabilityAddXDD-Mode-
                                    r9      OPTIONAL,
        nonCriticalExtension        UE-EUTRA-Capability-v1500-IEs
                                        OPTIONAL
}
UE-EUTRA-Capability-v1500-IEs ::= SEQUENCE {
        phyLayerParameters-v1500        PhyLayerParameters-v1500,
...
        mbms-Parameters-v1500           MBMS-Parameters-v1500
                                        OPTIONAL,
        sl-Parameters-v1500             SL-Parameters-v1500
                                        OPTIONAL,
        ...OPTIONAL
}
SL-Parameters-v1500 ::=         SEQUENCE {
    sl-v2xinterworkingVehicleIndication-r15 SL-
                                    V2XinterworkingVehicleIndication-r15
                                        OPTIONAL
}
SL-V2XinterworkingVehicleIndication-r15 ::= SEQUENCE {
        interworkingActivated                               BOOLEAN,
        supportedV2XiwTechnologiesAndCapabilities SL-
iwTechnologiesAndCapabilities-r15,
        ...
}
SL-iwTechnologiesAndCapabilities-r15 ::= SEQUENCE {
        v2XiwTechnologies                   SL-V2XiwTechnologies-r15
OPTIONAL,
        v2XiwCapabilities                   SL-V2XiwCapabilities-r15
OPTIONAL,
        ...
}
SL-V2XiwTechnologies-r15 ::=            SEQUENCE {
        r14LTEPC5-r15                   ENUMERATED {supported}
OPTIONAL,
        r15LTEPC5-r15                   ENUMERATED {supported}
OPTIONAL,
        r16NRPC5-r15                    ENUMERATED {supported}
OPTIONAL,
        IEEE802-11p-r15                         ENUMERATED {supported}
OPTIONAL,
         IEEE802-11bd-r15               ENUMERATED {supported}
OPTIONAL,
        ...
}
SL-V2XiwCapabilities-r15 ::=        SEQUENCE {
        ETSIBTP-GN-r15                  ENUMERATED {supported}
OPTIONAL,
        IEEE1609-3-r15                  ENUMERATED {supported}
OPTIONAL,
        ...
}
-- ASN1STOP
```

SL-V2XinterworkingVehicleIndication field descriptions interworkingActivated
Indicates whether the source UE is currently performing V2X interworking between two or more V2X technologies
r14LTEPC5
Indicates support by the sender the capability of interworking to and from Rel-14 LTE-based PC5.
r15LTEPC5

TABLE 12-continued

Example modification to the RRC protocol as used on the Uu interface as defined in 3GPP TS 36.331.

Indicates support by the sender the capability of interworking to and from Rel-15 LTE-based PC5.
r16NRPC5
Indicates support by the sender the capability of interworking to and from Rel-16 NR-based PC5.
IEEE802-11p
Indicates support by the sender the capability of interworking to and from IEEE 802.11p.
IEEE802-11bd
Indicates support by the sender the capability of interworking to and from IEEE 802.11bd.
ETSIBTP-GN
Indicates support by the sender the capability of interworking to and from ETSI BTP/GN.
IEEE1609-3-2010
Indicates support by the sender the capability of interworking to and from IEEE 1609.3-2010

These example modifications are, of course, not exhaustive. Modifications may be made in different ways to achieve the same result.

The availability of the interworking unit 190 having been indicated to other entities in the system, a next step may be the configuration of a new platoon. The formation of a platoon may be automatic ("dynamic platoon forming"), or manual, for example with human intervention ("static platoon forming"), or a combination of both dynamic and static forming ("semi-static platoon forming", "semi-dynamic platoon forming"). This may be done, as in the example of FIG. 7, using platoon management entity, which may be resident in a vehicle, or within a server (e.g., the server 120) or in a cloud-based service (e.g., system 150). In this example, the PME 120 is illustrated as a separate entity to a vehicle (e.g., interworking unit 190, which may be a vehicle, or vehicles 170A) but as discussed above, the example implementation in FIG. 7 is not limiting, and modifications can be made, which will be within scope of the person skilled in the art.

The PME 120 controls various aspects of the platoon, such as its membership, member status, and configuration, and communicates platoon configuration parameters to all members of the platoon and any other entity or application to be used in controlling or communicating to the platoon. The platoon itself may be composed of vehicles having different parameters and capabilities, as may be determined by the PME. Parameters and capabilities can include vehicle size (e.g. one or more dimensions of the vehicle), a destination (e.g. one or more GPS co-ordinates, one or more predetermined values that relate to a specific place, etc), route waypoints (e.g. one or more GPS co-ordinates, one or more predetermined values that relate to a specific place, etc), number of antennas, antenna radiation pattern, antenna height (e.g. in measurement units (e.g. millimeters)), and so forth. In these embodiments, the platoon can include vehicles using different communication technologies or feature sets. The PME 120 may use information about the parameters and capabilities of individual vehicles, as well as information about vehicles or other entities capable of acting as an interworking unit 190, to create a platoon using more than one V2X RAT (e.g., more than one communication protocol or feature set) by relying on the interworking unit 190 to ensure communications between different vehicles with different communications characteristics.

Figure 7:
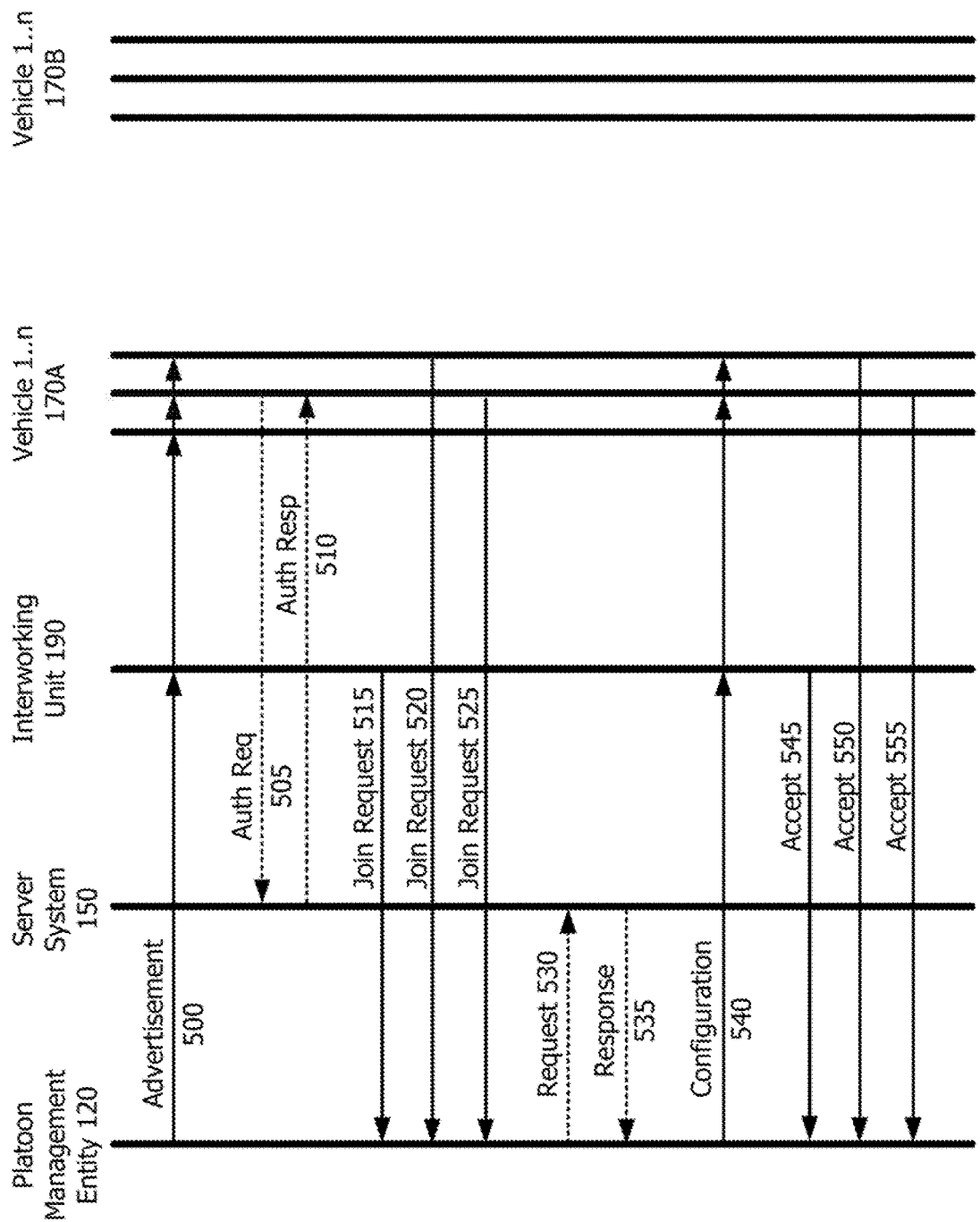
FIG. 7 is a messaging diagram illustrating platoon formation and configuration.

FIG. 7 sets out an example interaction in a simple case between a PME 120, a server system 150, the interworking unit 190, and vehicles 170A (a set of 1 . . . n vehicles in this example) communicating using a first V2X RAT. As an initial step to create or increase the size of an existing platoon, the PME 120 may transmit an invitation or advertisement 500, identifying itself and the intention to form a platoon and/or increase the size of an existing platoon. The invitation may include information such as start point, waypoints, and destination point, and departure date/time, and any other information that is determined to be required to permit a receiving vehicle to respond to the advertisement. In this simple example, the advertisement is transmitted using only a first V2X RAT and is thus received and acknowledgeable by vehicles in a first set that is configured to use the same V2X technology, such as vehicles 170A. The advertisement messages may be sent several times. In a more complex example, for example adding in some steps of FIG. 9 discussed below, once an interworking function is available to the PME 120, the PME 120 may initiate transmission of advertisements using one or more V2X RATs. In the example of FIG. 7, the interworking unit 190 (which may be comprised in a vehicle) and the vehicles 170A receive the advertisement 500.

When a vehicle receiving the advertisement is capable of joining a platoon, the vehicle 190, 170A may then verify the platoon advertisement, and/or the PME 120 identity or location in order to ensure the PME is a valid or authorized PME. This may occur by messaging a known server, such as the server system 150, and obtaining a response (optional authentication request 505 and response 510).

If the PME 120 is successfully verified, interested vehicles (including the interworking unit 190) may then transmit join request messages 515, 520, 525 to the PME 120 indicating the availability of the interested/sending vehicle to join the platoon, with identifying information about the interested vehicle and requesting platoon membership, and/or indicating the interested vehicle's capabilities and parameters, as described above. This message may be transmitted via other routes through the network 100. The PME 120 may then use the identifying information to request authenticating information about the requesting vehicles, for example from the server system 150, prior to accepting the requesting vehicles into the platoon (optional request 530 and response 535).

The join requests 515, 520, 525 may include the vehicle's capabilities and parameters together with the join requests, or else the additional information may be sent in a separate message from the join request. Alternatively, the PME 120 may obtain this information from a separate source such as the server system 150. Thus, if the interworking unit 190 had previously registered with the server system 150 as an interworking unit 190, the PME 120 may receive information about interworking capabilities from the system 150. The PME 120 uses information about each vehicle's capabilities and other parameters to determine membership of the vehicle. For example, it may be desirable to build a platoon including specific vehicle sizes or technology capabilities, and specifically, the PME 120 may include the interworking unit 190 in the platoon in order to extend the range of its communications beyond the single V2X RAT used by the vehicles 170A.

The PME 120 then sends an invitation and/or configuration message 540 to those vehicles accepted into the platoon. This message may comprise common instructions for all accepted vehicles, and can be transmitted in a broadcast or multicast; or alternatively, individual configuration messages may be sent to each accepted vehicle, and can include individual instructions concerning the respective configuration of the vehicle and the vehicle's location in the platoon. Thus, for example, an individual configuration message 540 sent to the interworking unit 190 may include an instruction to activate the interworking unit 190's interworking function to enable the PME 120 to extend the PME 120's communication range to vehicles employing other technologies. Configuration messages may be transmitted directly between the PME 120 and the vehicles; however, in the case where the PME 120 is outside the convoy—for example, in a remote computing system—then configuration information may be disseminated within the platoon by transmissions between adjacent vehicles. A direct or multicast message may be sent with identifiers with specific recipients, whereas a broadcast message may be intended only for certain recipients, but received by more entities. To restrict receipt of information to only platoon members, security measures such as encryption may be used to ensure that the message is decryptable and readable only by the intended recipient.

Other information contained in the message may be information necessary to configure the platoon, including establishing and configuring the members of the platoon, plus route information such as start point, waypoints and endpoints, and timing including start and waypoint target times/dates. Other information in the message may include a platoon identity, one or more identifiers associated with other vehicles in the platoon, a primary V2X RAT supported, an indication of whether or not there is an interworking vehicle 190 available, and if so, the interworking vehicle 190's one or more identities, position within the platoon, and other RATs supported, and so forth. In particular, confirmation of a V2X RAT to be used by the platoon may be useful, since it may confirm to a vehicle supporting more than one V2X RAT which V2X technology is actually to be used, and to the platoon vehicles generally which protocols are to be used for message transfer with entities outside of the platoon.

The configuration message 540 may be considered to be in the nature of an invitation or request, since those vehicles receiving the configuration message, after determining that the message was intended for them, may then make a decision to join the platoon. If so, the vehicle may then transmit acknowledgment or acceptance messages 545, 550, 555 to the PME 120. Each vehicle receiving and accepting a configuration message would then configure itself accordingly, for example moving to its designated position in the platoon; in the case of the interworking unit 190, it may invoke its interworking function in response to an instruction to do so in the configuration message 540. If the vehicle receiving the configuration message determines that it will not join the platoon, the vehicle receiving the configuration message may send a rejection message to the PME 120 (not shown), which may comprise a reason code for the rejection.

When all the vehicles for the platoon are configured, or at some predetermined time or upon a triggering event after configuration, vehicles will form a platoon. This formation may initially start with some pre-checks such as vehicles identifying themselves to each other and their other platoon members along with confirming reliable communication status. Once any pre-checks are complete, the vehicles may arrange themselves in a physical formation such that a lead or primary vehicle is known and may establish itself at the head of the platoon, i.e., the front of the line of vehicles that constitute the platoon. The other vehicles will fall in to order, if an order was received or indicated by the platoon configuration or by some other determination. Where any one vehicle has a particular position or location to occupy—for example, the interworking vehicle 190 may be required to occupy a specific position to ensure reliable communications throughout the platoon—then that vehicle will take up that position in the physical platoon order. Taking up this position may involve communicating to one or more of the vehicles already in the formation, in order that they may recognize the positional requirements of the platoon configuration as instructed by the PME 120 (not shown in FIG. 7).

Figure 8:
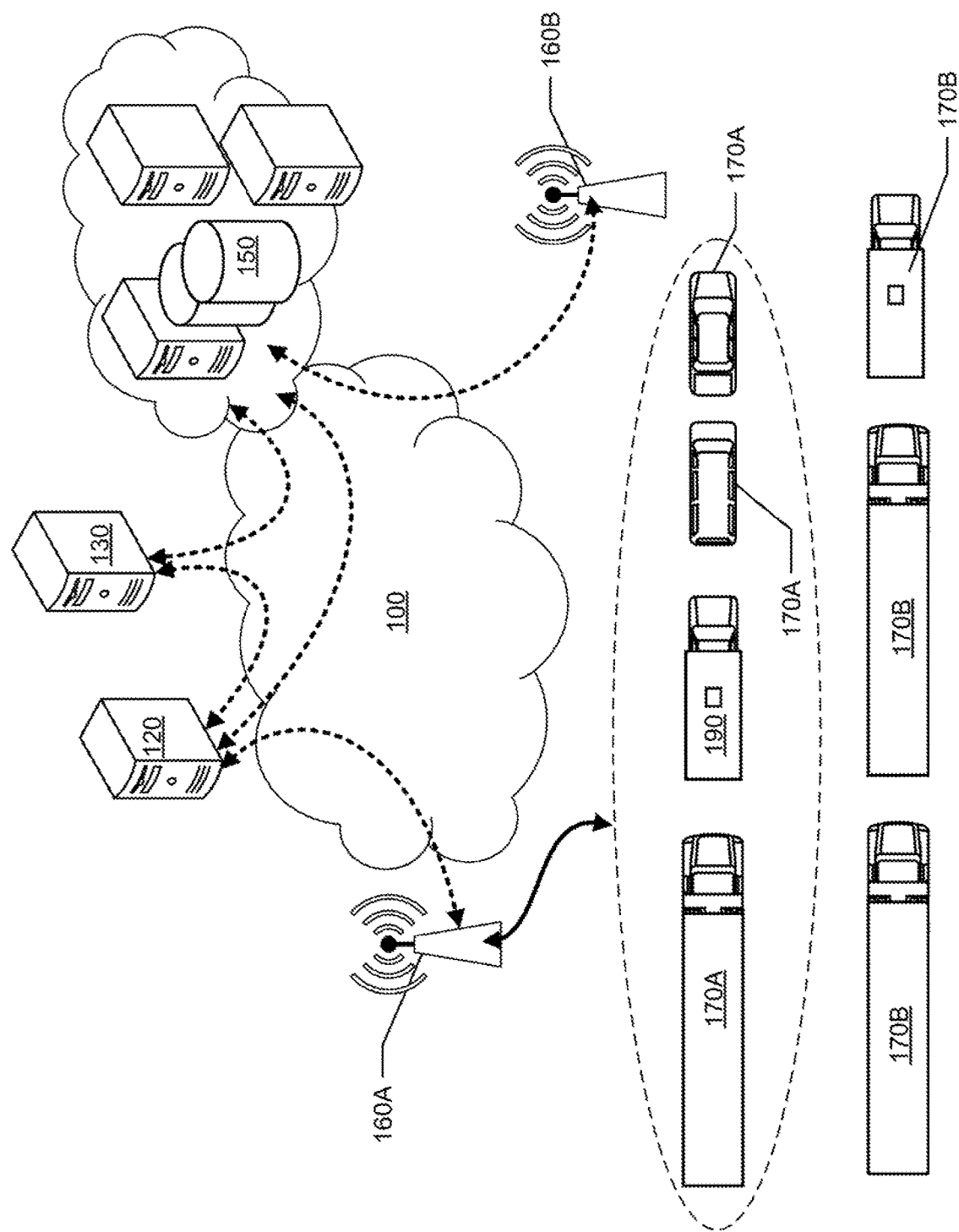
FIG. 8 is an illustration of a platoon in the system of FIG. 2.

An end result of the platoon formation and configuration described above may be the result depicted in FIG. 8, in which a set of vehicles 170A and an interworking vehicle 190 have formed a platoon (as indicated by the dashed outline). This example platoon communicates amongst themselves and with the PME 120 using a first V2X RAT.

Figure 9:
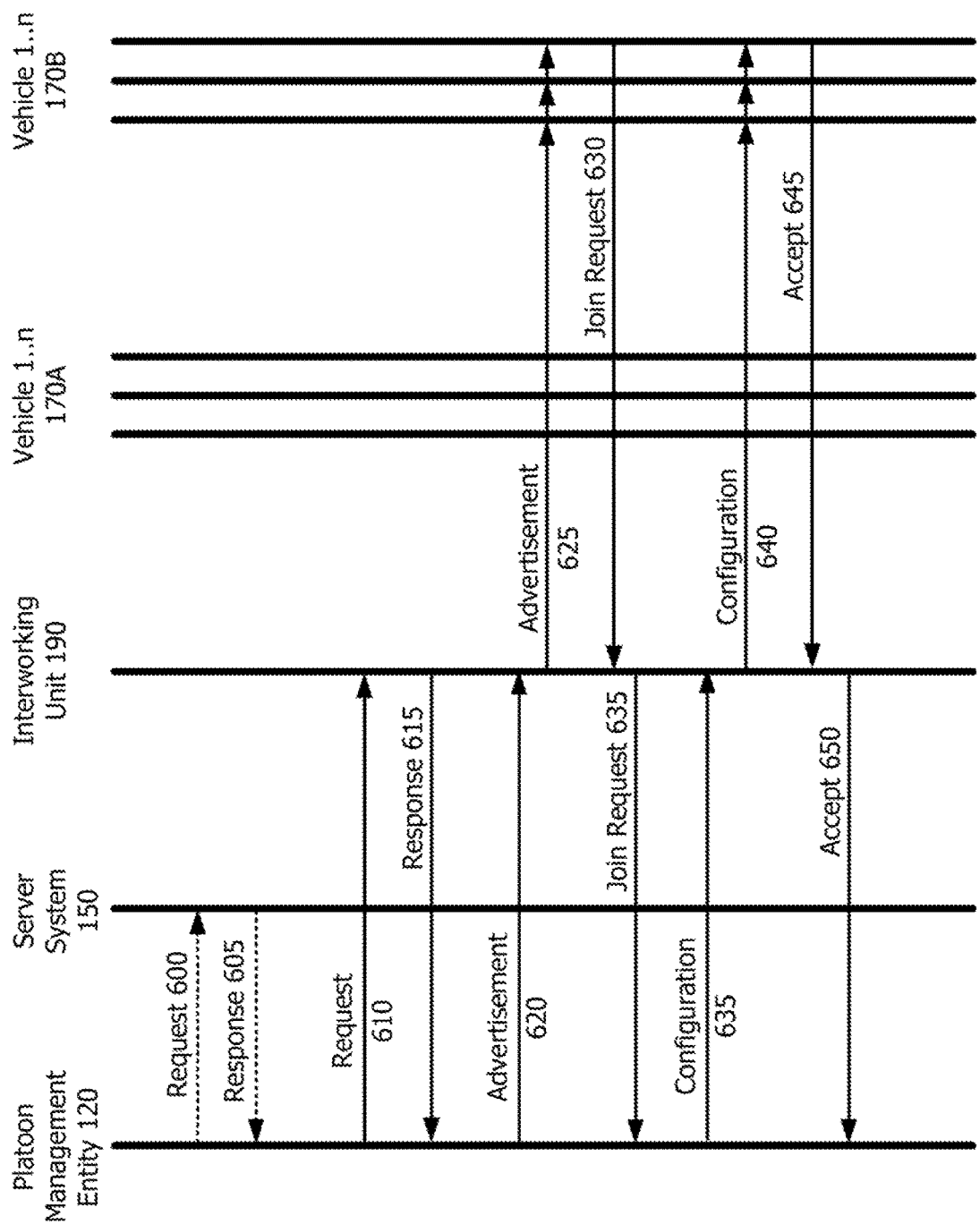
FIG. 9 is a messaging diagram illustrating platoon formation or expansion.

FIG. 9 depicts another example of platoon formation or platoon expansion using an interworking unit 190. In this example, the PME 120 discovers the availability of an interworking vehicle 190. This may occur generally as described with respect to FIG. 7, or alternatively, may occur when the PME 120 queries the server system 150 or other vehicle registration system for information about available vehicles for a platoon, or vehicles with specific capabilities (request 600 and response 605). The PME 120 may then instruct the interworking vehicle 190 to provide the interworking function (request 610). If the interworking unit 190 is available to fulfil the request, the interworking unit 190 may send an acknowledgment confirming the instruction (response 615), or send/transmit a message rejecting the instruction, which may comprise a reason code for the rejection. Alternatively, this transaction between the PME 120 and the interworking vehicle 190 may be a platoon advertisement and a request to join, followed by a configuration instruction to begin interworking.

With the interworking vehicle 190 in operation, the PME 120 may transmit advertisements for the platoon using multiple V2X RATs, via the interworking vehicle 190. For example, the PME 120 may transmit a platoon advertisement 620 in the first V2X RAT that the interworking vehicle 190 and other vehicles using the first V2X RAT. The interworking vehicle 190 converts the received platoon advertisement 620 to a second V2X RAT format, for example by extracting information from the message in the first format, and reformatting the message in the second format. Depending on the differences between the two V2X RATs, other steps may be required. The interworking vehicle 190 then transmits the reformatted advertisement message 625 to other vehicles that can receive second V2X RAT messages, such as vehicles 170B. Table 13 sets out an example modification (a new WSMP frame) of a platoon advertisement message in IEEE 1609.3.

TABLE 13

Example frame for platoon advert.

| | WAVE Element ID = 11 | Length | Platoon/ Interworking Unit ID | List of Vehicle IDs | Location | Information (optional) |
|---|---|---|---|---|---|---|
| Octets | 1 | 1 | 2 | 4 | 8 | variable |

Table 14 sets out a new platoon advertisement ANQP element based on IEEE 802.11bd, which may be used to advertise the capabilities of a PME or an interworking unit from one 802.11 station to another.

TABLE 14

Example platoon advert ANQP-element format.

| | Info ID | Length | Platoon/ Interworking Unit ID | List of Vehicle IDs | Location | Information (optional) |
|---|---|---|---|---|---|---|
| Octets | 2 | 2 | 2 | 1 | 8 | variable |

The Platoon/Interworking Unit ID is an identifier of the existing PME or the interworking vehicle. This field also indicates whether the element contains information from the PME or the interworking vehicle. The List of Vehicle IDs is a list of identifiers of the vehicle that belong to the platoon or interworking vehicle, although this field may not be used due to privacy reasons. The Location is the current location of the PME or the interworking vehicle. This may be an absolute position, or a relative position offset from the location of the PME or the interworking vehicle ID. Information is an optional field containing other information about the platoon/interworking vehicle, such as security information.

Join requests 630 from interested vehicles 170B may be received by the interworking vehicle 190, then converted from the second V2X RAT format to the first V2X RAT format, and sent to the PME 120 for processing (join request 635). If the vehicle 170B is accepted, the PME 120 would then transmit configuration information as described before, again via the interworking vehicle 190 (configuration messages 635, 640). Acceptance messages (645, 650) are transmitted back via the interworking vehicle 190 as described above, or rejection messages, which may comprise a reason code for the rejection.

Table 15 depicts an example new WSMP frame for the platoon join request based on IEEE 1609.3 to accommodate the interworking vehicle, where Vehicle ID is the identifier of the vehicle transmitting the element; Platoon/Interworking Unit ID is the identifier of the existing platoon, PME 120 or interworking vehicle 190 the requesting vehicle wishes to join; and the optional Information field may contain other information about the vehicle, such as security information.

TABLE 15

Example frame for platoon join request.

| | WAVE Element ID = 12 | Length | Platoon/ Interworking Unit ID | Information (optional) |
|---|---|---|---|---|
| Octets | 1 | 1 | 4 | variable |

Figure 10:
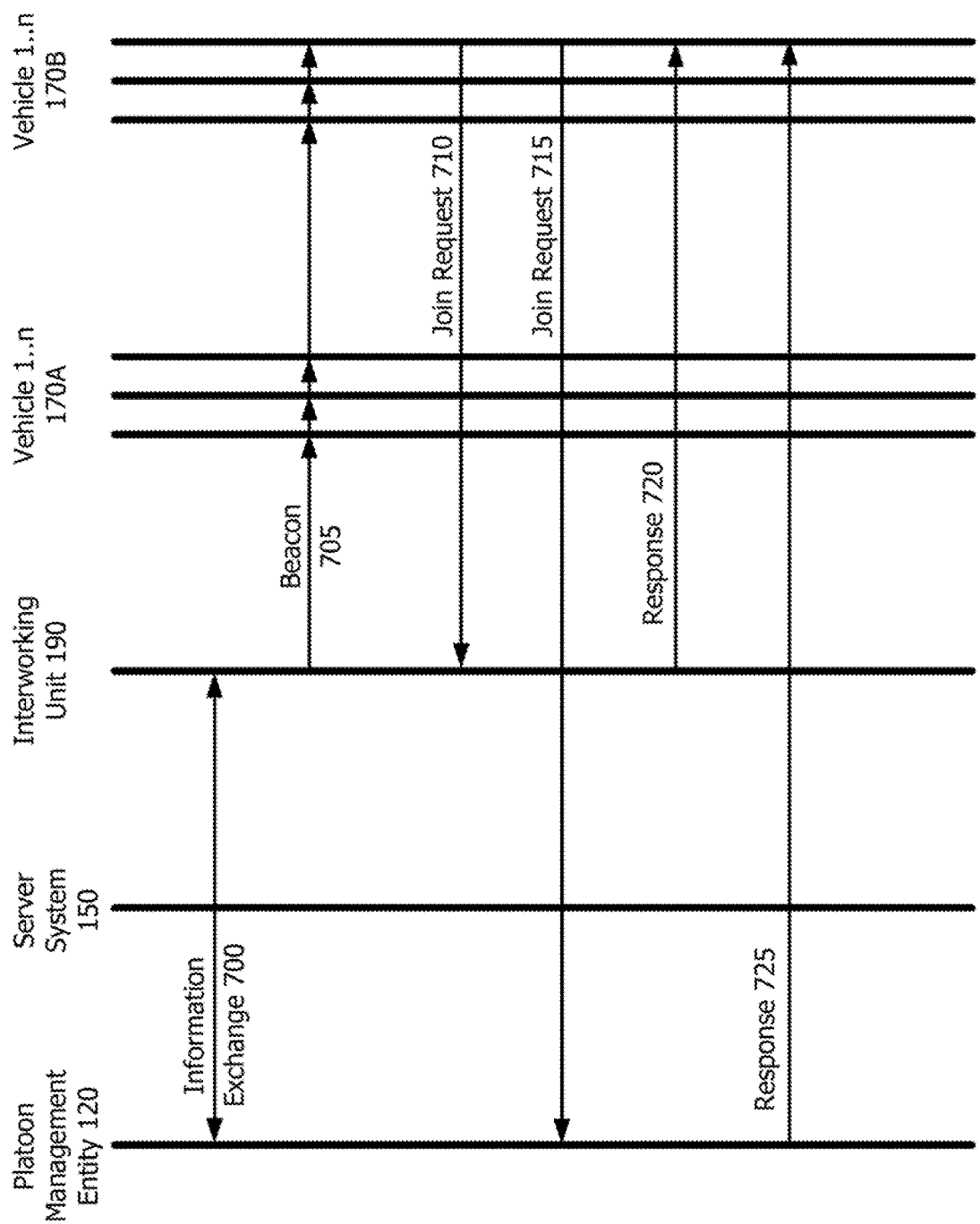
FIG. 10 is a messaging diagram illustrating use of an interworking vehicle to expand a platoon.

In the case of either FIG. 7 or FIG. 9, the platoon was established with assistance from the interworking vehicle 190 during initial formation of the platoon. FIG. 10 illustrates an example of how a further vehicle may join an existing platoon through an interworking vehicle 190, which may or may not be part of the platoon. If required, initially the interworking vehicle 190 and the PME 120 may exchange information (information exchange messages 700) so that they are aware of each other and their capabilities. As part of this information exchange, the PME 120 may instruct the interworking vehicle 190 to begin providing the interworking function, if it is not already. This information exchange may not be necessary if the interworking vehicle 190 was already a member of the platoon managed by the PME 120, since the PME 120 may have obtained information about the interworking vehicle's capabilities earlier. It also would not be necessary if the interworking vehicle 190 and PME 120 were co-located on the same vehicle.

The interworking vehicle 190 may then transmit a beacon message (beacon 705) using one or more V2X RATs. FIG. 10 illustrates two V2X RATs, a first V2X RAT compatible with vehicles 170A and a second V2X RAT compatible with vehicles 170B. The beacon 705 message may be a broadcast or multicast message to be received by any V2X-capable vehicle in communications range, containing an invitation to join the platoon, and setting out its interworking capabilities, and optionally capabilities of the platoon. An interested vehicle may send a request message to join the platoon. For vehicle 170B, the request message (join request 710) is transmitted to the interworking vehicle 190. Another request message (join request 715) is transmitted by the vehicle to the PME 120. In this case it is presumed the PME 120 is reachable using the V2X RAT used by the requesting vehicle, for example via an access point or wireless gateway, though the network 100. If, on the other hand, the PME 120 and the interworking vehicle 190 are co-located on the same entity (e.g. a vehicle, a server), distinct messages do not need to be sent. If the vehicle 170B making the request cannot access the PME 120, then the request to join may be converted and forwarded by the interworking vehicle 190 to the PME 120, generally as described with respect to FIG. 9.

Figure 11:
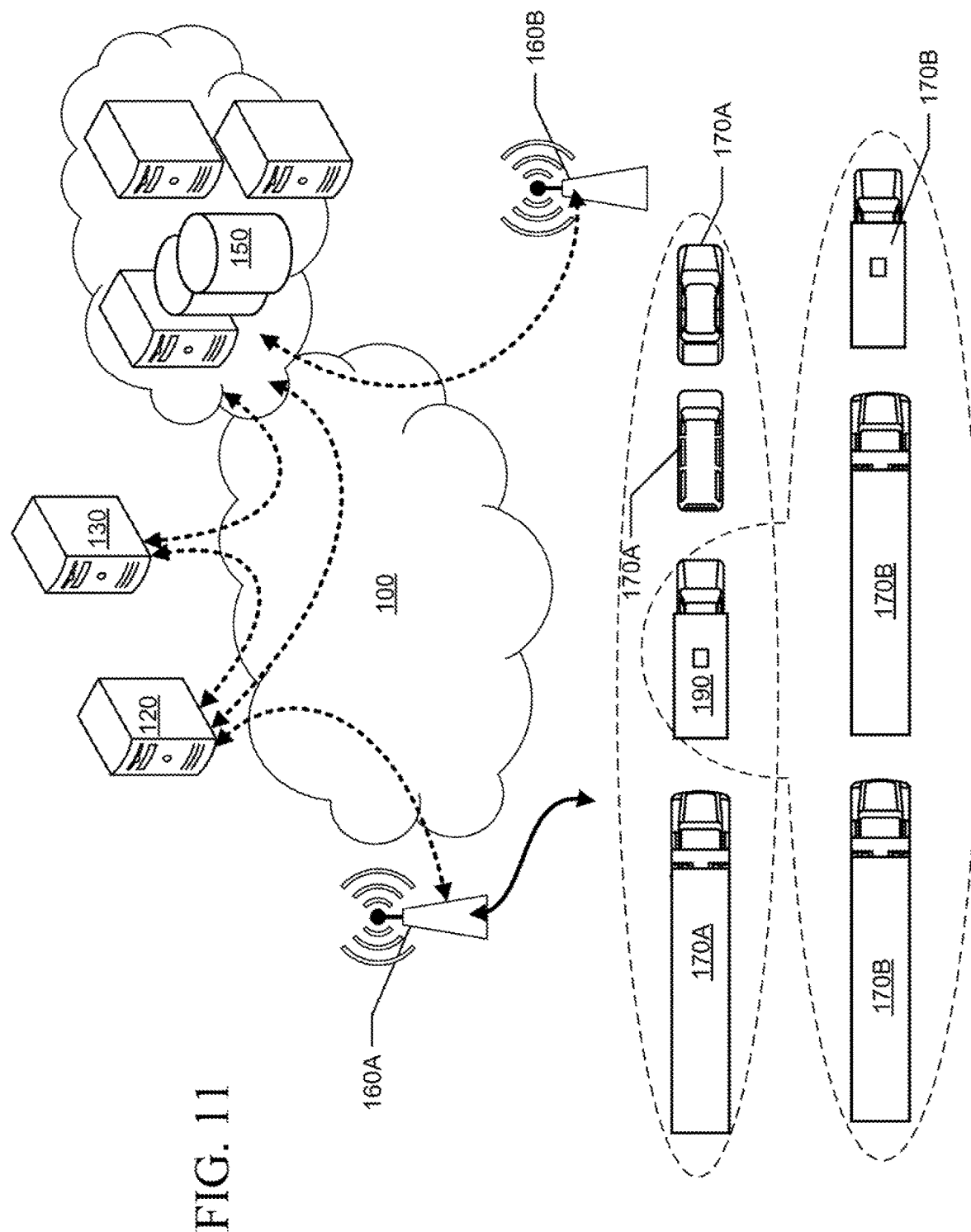
FIG. 11 is an illustration of a further platoon in the system of FIG. 2.

Both the interworking vehicle 190 and the PME 120 may then respond to the request to join (responses 720 and 725, respectively). The response from the interworking vehicle 190 and/or PME 120 may comprise configuration information and other details concerning the interworking vehicle 190 and the platoon. If, on the other hand, the request to join is rejected, the response 720 or 725 may include one or more reason codes or error codes indicating why the request is refused. Thus, through the interworking vehicle 190, the platoon may be expanded to add vehicles communicating using either the first or second V2X RAT. Consequently, the platoon may include vehicles using two, three, or more V2X RATs, provided they are supported by an interworking vehicle 190 in the platoon. This is illustrated schematically in FIG. 11, in which the vehicles 170A, 170B, and 190 form a platoon. A first subset of the vehicles of the platoon operate using a first V2X RAT, while a second subset of vehicles operates using a second V2X RAT. The interworking vehicle 190 may be considered to be a member outside of the platoon/either subset of vehicles, but bridging both subsets of vehicles; or may be considered to be a member of the platoon/both subsets of vehicles. In some implementations, rather than simply permitting individual vehicles of the second subset to join, an entire subset of vehicles operating with the second V2X RAT may join the first subset through the interworking vehicle 190. This may occur, for example, when two smaller platoons, each using a respective V2X RAT, merge together to create a super-platoon. Correspondingly when the super-platoon splits into smaller platoons/sub-platoons, the interworking vehicle 190 may remain a member of one of the new sub-platoons or indeed all new sub-platoons.

It will be appreciated that using the interworking function of the interworking vehicle 190, individual vehicles and other platoon entities in the platoon are able to relay messages to one another even though the individual vehicles are using incompatible V2X RATs. The relayed/interworked messages may be for any purpose, such as control of the platoon, or presentation of an audible, visual, or haptic alert to an occupant (e.g. driver) of a vehicle. The interworking vehicle 190 may also be used to relay/interwork information obtained from its own platoon to another platoon or vehicle that is not joining or not part of a platoon. This is useful to help ensure that V2X messages (e.g. V2X messaging related to emergencies) are received by all affected vehicles, provided they are within communication range of the interworking vehicle 190. The interworking vehicle 190 may relay/interwork messages to other entities in the system, such as RSUs (not shown in FIG. 11) or to a base station or access point providing access to the network 100. To further extend the communicating range of the interworking vehicle 190, a first interworking vehicle 190 in a platoon may communicate with another interworking vehicle 190 in the same or a different platoon, and relay messages to each other to thereby extend wireless coverage, even in underground environments or areas without infrastructure deployment. In addition, when one or more of the V2X RATs is IEEE 802.11 (e.g., IEEE 802.11p or IEEE 802.11bd), the interworking vehicle 190 may operate as a mobile hotspot for other vehicles.

Table 16 sets out an example of a new WSMP frame modifying IEEE 1609.3 for an interworking vehicle invitation (i.e., the beacon 705) that may be sent by the interworking vehicle 190, where Interworking Unit ID is an identifier of the interworking vehicle 190, and the Reason Code is an explanation why the invitation was made.

TABLE 16

Example frame for interworking vehicle invitation.

| WAVE Element ID = 13 | Length | Interworking Unit ID | Reason Code | Information (optional) |
|---|---|---|---|---|
| Octets 1 | 1 | 2 | 1 | variable |

Table 17 is an example of a new WSMP frame modifying IEEE 1609.3 for a vehicle response to an interworking vehicle invitation. The Reason Code may include an indication that the invitation was accepted, or may include a reason for a rejection or another condition (e.g., a postponement of the request/joining, or poor signal).

TABLE 17

Example frame for invited vehicle response.

| WAVE Element ID = 14 | Length | Vehicle ID | Reason Code | Information (optional) |
|---|---|---|---|---|
| Octets 1 | 1 | 2 | 1 | variable |

Once vehicles are configured in a platoon, the order or location of the individual vehicles may be determined by the PME 120 on the basis of a number of factors. The order or location may be set at the configuration stage of platoon formation, described above. The decision to assign a given order to a vehicle may be arbitrary and performed at any time, or based on specific factors such as vehicle capabilities. On occasion, it may be required to reconfigure or reorder the vehicles in a platoon, for example to compensate for departing vehicles, environmental changes, or changes to the capabilities of a vehicle in the platoon. For example, it may be desirable to rearrange the location of the interworking vehicle 190 within a platoon to maximize radio coverage by the interworking vehicle 190 over the rest of the vehicles in the platoon, or to increase the coverage of the interworking vehicle 190 outside the platoon, so that additional vehicles using different V2X RATs may be added. Thus, factors that may determine whether to reposition a vehicle or position a vehicle at a specific location within a platoon may include the capabilities of the vehicle which indicate its ability to provide radio communications, such as the gain of the antennas, height of the vehicle and height/location of the antennas. These characteristics may be reported by the vehicle at the time of joining the platoon. Another possible factor is received signal strength of radio transmissions from other members of the platoon. This may be combined by a platoon management function with other factors such as the vehicle's capability e.g. antenna height or antenna gain, to enable the platoon management function to determine an optimum location for a specific vehicle within the platoon to maximize the reliability of communications within the platoon and to ensure the availability of an interworking function within the platoon.

To assist V2X interworking within an existing platoon, the interworking vehicle 190 may be required to report to the PME 120 or to make decisions about the format or order of the platoon, for example to optimize the connectivity of all the V2X vehicles within the platoon network. This may be done autonomously or in conjunction with an existing PME 120. As input, the interworking vehicle 190 may require information about the V2X RAT capabilities (which V2X RATs are supported, which features and functions of those V2X RATs are supported, what version of the V2X RAT and/or features and functions are supported, etc.) of the other vehicles in the platoon, as well as their locations in the platoon, in addition to other information relevant to their ability to move to a different location within the platoon.

Figure 12:
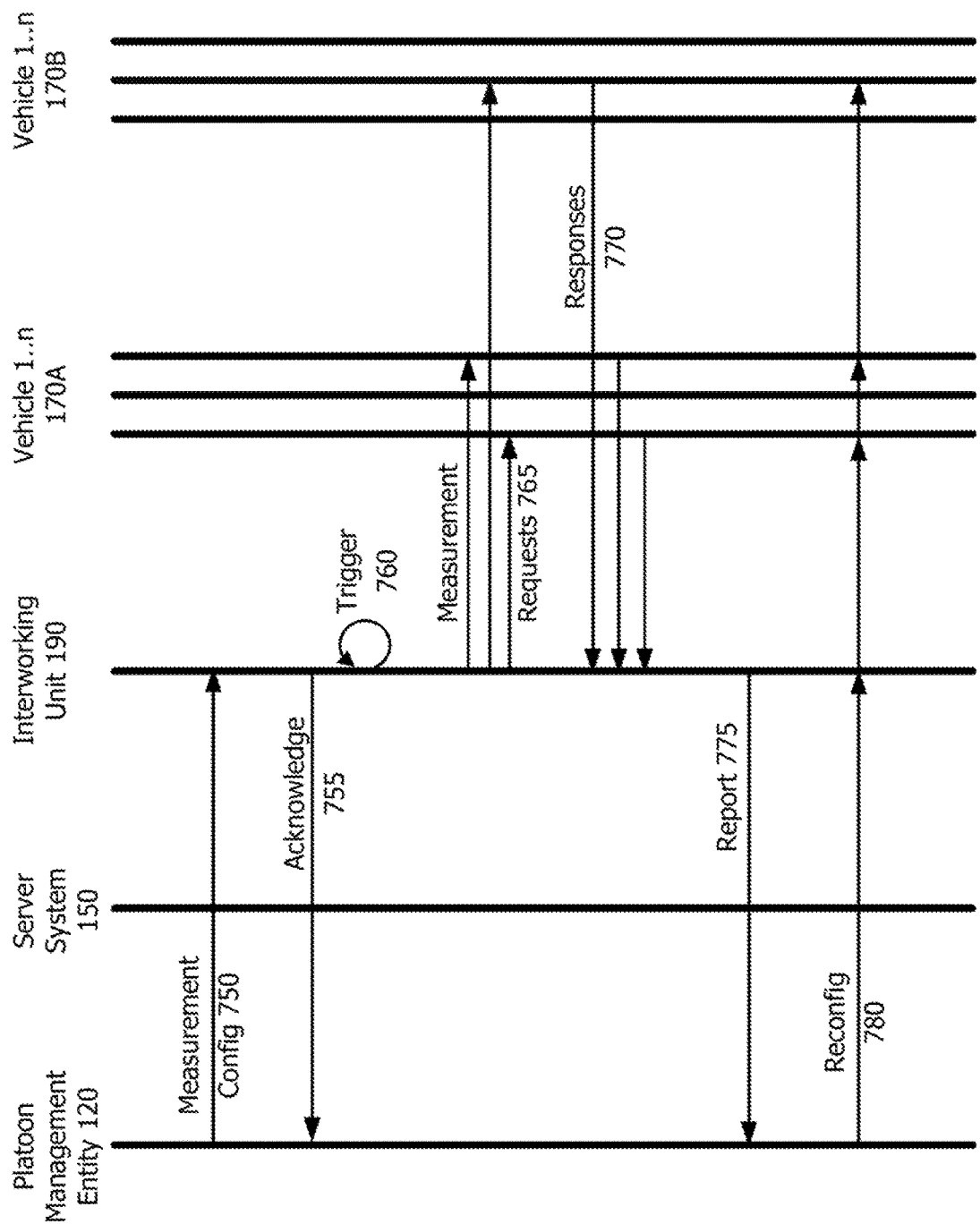
FIG. 12 is a messaging diagram illustrating a measurement report function of the interworking vehicle.

FIG. 12 illustrates possible messaging between an interworking vehicle 190, PME 120, and other vehicles of the platoon. Initially, the PME 120 or another controlling entity for the platoon to which the interworking vehicle 190 belongs transmits instructions configuring a measurement action to be undertaken by the interworking vehicle 190 on demand, or in response to certain triggering events (measurement configuration message 750). The measurement configuration message may identify the parameters to be measured (e.g., vehicle speed, signal strength), identification of the vehicles to be measured (if required), trigger events, and instructions to filter measurements prior to reporting. This configuration message 750 may be included with the initial configuration message transmitted to the interworking vehicle 190 at the time it joined the platoon, or may be transmitted in a separate message as illustrated in FIG. 12. The interworking vehicle 190 acknowledges the measurement configuration message and confirms that configuration is complete (acknowledgement message 755), or transmits a message rejecting the instruction, which may comprise one or more reason codes for the rejection.

On the occurrence of a triggering event 760, which may be, for example, a request to join the interworking vehicle 190 (e.g., as described with respect to FIG. 10); expiration of a timer; a measurement threshold being exceeded, such as a reduction in signal level or quality from a given platoon member below a specified level, or an ad hoc request from the PME 120, the interworking vehicle 190 obtains measurements, if necessary, from the other vehicles in the platoon. This may include requests (measurement requests 765) for sensor and other operational parameters from vehicles using the same or different V2X RATs, as shown in FIG. 12. The vehicles provide their sensor readings and other data by response (responses 770). In some instances, the interworking vehicle 190 may collect some or all of the required data during normal operation of the platoon, as it relays/interworks messages between different platoon entities, and may not need to request some or all of the measurements required. For example, signal strength and signal quality, current speed, acceleration, location etc. may be periodically exchanged between the vehicles in the course of the platoon's activities. In some implementations, measurements may also be collected from vehicles within communications range of the interworking vehicle 190 that are not members of the platoon, as this information may be pertinent to a decision to reorder the platoon.

The interworking vehicle 190 then compiles a measurement report in accordance with its configuration and transmits it to the PME 120 (report 775). The PME 120 may then determine whether to reconfigure the platoon, for example assigning new configuration parameters to one, some, or all members of the platoon. If a reconfiguration is determined, the reconfiguration instructions may then be broadcast, multicast, or sent directly to each vehicle in the platoon (reconfiguration message 780). Each vehicle may acknowledge receipt of the message (not shown in FIG. 12). In response to the reconfiguration message 780, vehicles may then perform a physical maneuver consistent with the reconfiguration instructions (for example, change order within the platoon, close up a gap or increase a cap between the vehicle and a leading or following vehicle, etc.), then signal when reconfiguration is complete either to the PME 120 directly, or via the interworking vehicle 190 if the vehicle requires the interworking function to be able to communicate with the PME 120. It may also be noted that as a result of reconfiguration, the interworking vehicle 190 may be advantageously placed in the platoon to use a further V2X RAT that it was not previously using.

Table 18 sets out an example new WSMP frame based on IEEE 1609.3 to implement platoon reconfiguration in association with an interworking vehicle. This message would be received by a target vehicle in the platoon (identified by Vehicle ID) and identifies the new location to which the vehicle should move.

TABLE 18

Example frame for platoon reconfiguration instruction.

| WAVE Element ID = 15 | Length | Platoon/ Interworking Unit ID | Vehicle ID | New Location | Information (optional) |
|---|---|---|---|---|---|
| Octets 1 | 1 | 2 | 4 | 8 | variable |

Figure 13:
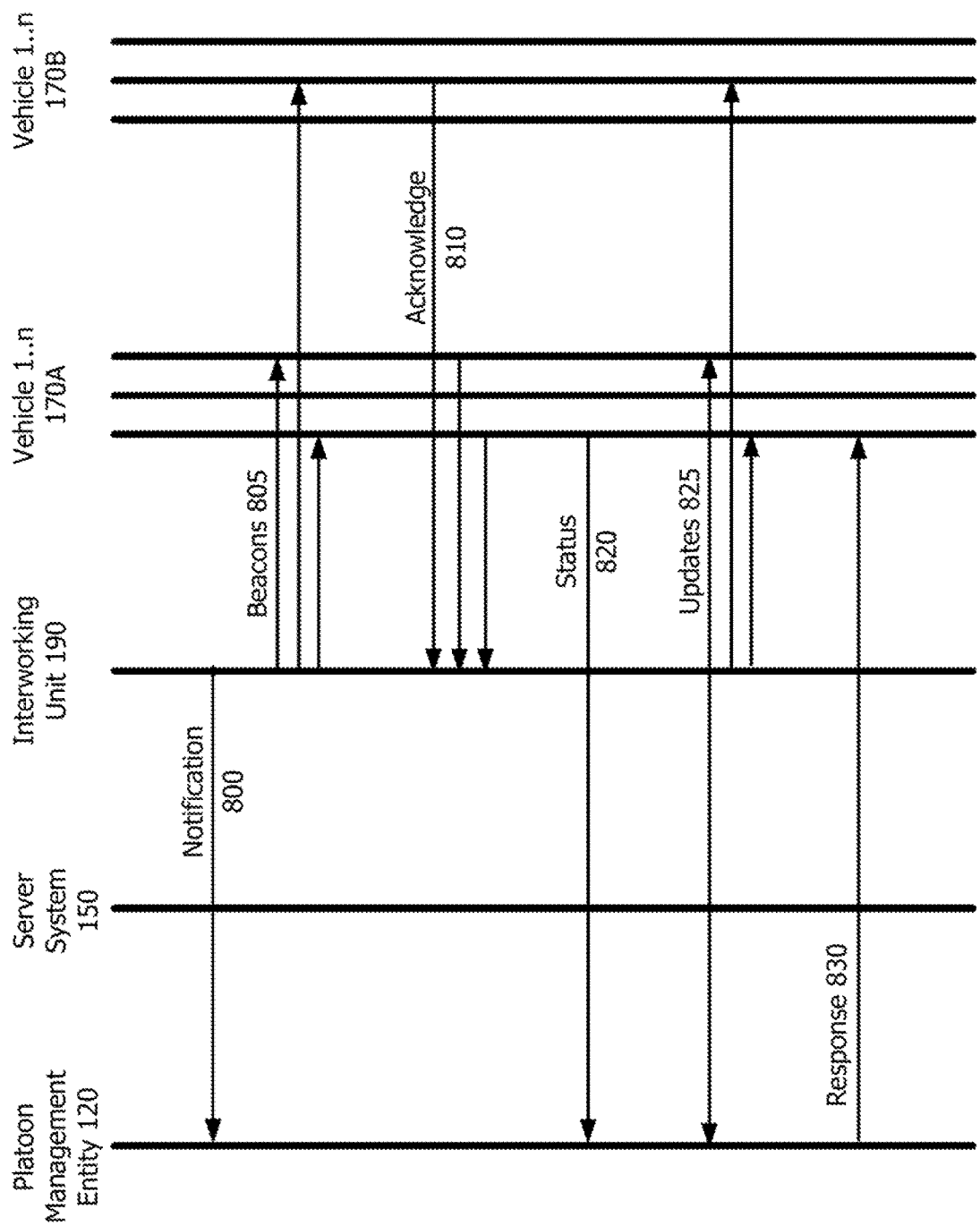
FIG. 13 is a messaging diagram illustrating a process for an interworking vehicle to leave a platoon.

An interworking vehicle 190 may be required to cease interworking operations, for reasons such as, but not limited to, equipment failure, a need to conserve resources, a need to leave the platoon, etc. A procedure for an interworking vehicle 190 to cease interworking operations and/or leave a platoon is shown in FIG. 13. Initially, information is exchanged between the interworking vehicle 190 and the PME 120, in which the interworking vehicle 190 informs the PME 120 of the interworking vehicle's intention to leave the platoon and/or cease providing the interworking function. This presumes that the interworking vehicle 190 is capable of giving advance notice to the PME 120 of a planned departure. Alternatively, the decision for interworking to cease may be made by the PME 120 (for example, because the platoon is to be reduced in size or disbanded), in which case the PME 120 would transmit an instruction to the interworking vehicle 190 to cease the interworking function. In the illustrated example, however, the information from the interworking vehicle 190 (notification 800) may include at least a projected time of departure (the time may be zero if the interworking vehicle 190 has already ceased providing interworking functions), and may include information such as a reason code for the cessation or departure.

The interworking vehicle 190 may also transmit a beacon message to the other vehicles in the platoon (beacons 805), also notifying the other vehicles of the cessation of interworking functions. The information in this message may be similar to the notification 800, and may include additional information about the platoon, such as the platoon identifier. Each of the vehicles may send an acknowledgment (acknowledge message 810). As a result of the notice the vehicles may also send a query to the PME 120 requesting updated information about the platoon status (status request 820).

Once the interworking vehicle 190 departs from the platoon or terminates/ceases its interworking function, it may send a final departure message to the PME 102 and/or the other vehicles (updates message 825). This message may include useful information for other vehicles in the platoon, such as identities/identifiers of other interworking vehicles that may be available, the time of departure, information about the platoon, etc. The PME may further respond to the query by the vehicles with updated information about the platoon status (response 830). This response may include other information, such as reconfiguration instructions in view of the departure of the interworking vehicle 190, cessation of interworking functions, or information about new interworking vehicles or platoons that the vehicles may choose to join.

In some instances, departure of the interworking vehicle 190 or cessation of the interworking function may occur without notice. Loss of the interworking function may be detected by the PME 120 when acknowledgments or other messages are not received from those members of the platoon relying on the interworking vehicle 190.

Table 19 sets out an example new WSMP frame based on IEEE 1609.3 setting out a projected departure of an interworking vehicle, including an identifier for the interworking vehicle, a time in milliseconds at which the departure is predicted to occur, either in absolute time or as an offset time from the transmission of the element, and an identifier for a new interworking vehicle, if one is available and has been identified. In this example, if the Time field is set to 0, the departure has already occurred.

TABLE 19

Example frame for identifying departure of an interworking vehicle from a platoon.

| WAVE Element ID = 16 | Length | Interworking Unit ID | Reason Code | Time | New Interworking Unit ID | Information (optional) |
|---|---|---|---|---|---|---|
| Octets 1 | 1 | 2 | 1 | 4 | 2 | variable |

The foregoing examples thus provide a communication system for supporting a plurality of RATs, in which the communication system is configured to advertise its availability to provide an interworking function to at least one entity in a set of one or more entities—such as a vehicle in a platoon of vehicles—configured to use a first RAT of the plurality of RATs, thus enabling the entities of the set to communicate with others outside the set even where those others use a second RAT of the plurality that is incompatible with the first RAT. The interworking function effectively provides at least one entity of the set with simultaneous access to plurality of RATs, with the effect that its communication range is extended. This can be used to support cooperative and awareness messaging, as may be used in intelligent systems of automated, autonomous or semi-autonomous entities, by enabling the entities to communicate with other entities that are using a different RAT.

In particular, the foregoing examples provide a communication system and method for supporting a plurality of vehicle-to-everything radio access technologies (V2X RATs), comprising: at least one microprocessor configured to transmit, using a first V2X RAT of the plurality of V2X RATs, to at least one platoon entity of a platoon implementing the first V2X RAT, an indication that the communication system is available to support an interworking function for providing simultaneous access to the plurality of V2X RATs, the platoon comprising at least one vehicle; and receive, using one of the plurality of V2X RATs, an instruction to provide the interworking function. The one of the plurality of V2X RATs used to receive the instruction may be the same V2X RAT (i.e., the first V2X RAT), or a different V2X RAT from the first V2X RAT such as a second V2X RAT or a third V2X RAT. Different or distinct V2X RATs may comprise the same standard employing different feature sets, or different standards.

In one aspect, the at least one microprocessor is further configured to, while providing the interworking function: receive, using the first V2X RAT, a first message in a first V2X RAT format; and transmit, using the second V2X RAT, information comprised in the first message in a second message, wherein the second message is in a second V2X RAT format.

In another aspect, the indication comprises an identification of each of the plurality of V2X RATs; an indication whether the communication system is currently providing the interworking function; and/or an identifier for the communication system.

In further aspects, the communication system may be comprised in a portable mobile device, and/or may be comprised in a vehicle, a platoon management entity, a server system, or an RSU.

In another aspect, the indication is transmitted upon a triggering event associated with the vehicle comprising the communication system, wherein the triggering event comprises one of: the vehicle comprising the communication system arriving at a predefined location; and alteration of a configuration of the vehicle comprising the communication system.

Still further, the at least one microprocessor is further configured to receive, using one of the plurality of V2X RATs, an instruction to join the platoon.

In a further aspect, where the communication system is comprised in a vehicle and is a member of a platoon, the at least one microprocessor is configured to receive the instruction to provide the interworking function from a platoon management entity, and may also receive an instruction from the platoon management entity to alter a physical position of the vehicle in the platoon.

In other aspects, the at least one platoon entity is a platoon management entity, and/or a stationary server; the vehicle may be a ground vehicle or an aerial vehicle.

There is also provided a system and method implementing or implemented by a platoon management entity managing a first platoon of vehicles, the first platoon comprising members communicating using communication systems configured to use a first vehicle-to-everything radio access technology (V2X RAT), in which a method comprises: determining that an interworking function for providing simultaneous access to a plurality of V2X RATs including the first V2X RAT is available from an interworking vehicle comprising an interworking communication system capable of supporting the interworking function; and the platoon management entity including the interworking vehicle in the first platoon.

In one aspect, the platoon management entity determines availability of a further vehicle comprising a further communication system to join the first platoon, the further communication system being configured to communicate using a second V2X RAT of the plurality of V2X RATs; the platoon management entity transmits, via the interworking communication system utilizing both the first V2X RAT and a second V2X RAT of the plurality of V2X RATs, a request to join the first platoon to the further vehicle; and the platoon management entity receives, via the interworking communication system, an acknowledgement from the further vehicle; the platoon management entity including the further vehicle in the first platoon.

In another aspect, determining that the interworking function is available comprises the platoon management entity receiving, from the interworking communication system via the first V2X RAT, an indication that the communication system is available to support the interworking function.

In a further aspect, including the interworking vehicle in the first platoon comprises, after receiving the indication, the platoon management entity transmitting an instruction to provide the interworking function to the interworking communication system.

In still a further aspect, determining availability of the further vehicle to join the first platoon comprises the platoon management entity receiving, from the interworking communication system, an indication of the availability of the further vehicle to join the first platoon, the further communication system in communication with the interworking communication system; and/or determining availability of the further vehicle to join the first platoon comprises obtaining an indication of the availability of the further vehicle to join the first platoon from a server.

In another aspect, the further vehicle is a member of a second platoon, and transmitting the request to join the first platoon comprises transmitting the request to a platoon management entity for the second platoon.

In still another aspect, the platoon management entity, after including the interworking vehicle in the first platoon, transmits an instruction to the interworking communication system to alter a physical position of the interworking vehicle in the first platoon.

In still a further aspect, the platoon management entity transmits a first message to a first vehicle in the first platoon, the first message in a first V2X RAT format using the first V2X RAT, wherein the first vehicle is configured to communicate using the first V2X RAT; and transmits a second message to a second vehicle in the first platoon wherein the second vehicle is configured to communicate using the second V2X RAT, comprising transmitting the second message in a first V2X RAT format using the first V2X RAT to the interworking communication system for transmitting to the second vehicle.

In another aspect, the platoon management entity may detect a cessation of the interworking function; transmit, via the interworking communication system, a message to the further vehicle removing the further vehicle from the first platoon; and remove the interworking vehicle from the first platoon.

In another aspect, the platoon management entity detecting the cessation of the interworking function comprises receiving, from the interworking communication system, an indication of cessation of the interworking function.

In an aspect, the platoon management entity is comprised in a vehicle of the first platoon, a server system, or an RSU.

In a further aspect, the platoon management entity includes the interworking vehicle in the platoon prior to determining that the interworking function is available.

There is also provided a vehicle platoon, comprising a first subset of one or more vehicles, the first subset comprising a vehicle with a corresponding communication system configured to communicate using a first vehicle-to-everything radio access technology (V2X RAT); a second subset of one or more vehicles, the second subset comprising a vehicle with a corresponding communication system configured to communicate using a second V2X RAT from the first V2X RAT; and an interworking vehicle comprising an interworking communication system configured to communicate using both the first and second V2X RAT, the interworking communication system being configured to receive a first message in a first V2X RAT format using the first V2X RAT, and to send information comprised in the first message in a second message in a second V2X RAT format using the second V2X RAT.

In one aspect, a communication system of a first vehicle of the first subset is configured to transmit the first message and a communication system of a second vehicle of the second subset is configured to receive the second message.

In a further aspect, a communication system of a first vehicle of the first subset is configured to transmit the first message and the interworking communication system is configured to transmit the second message to an RSU.

In another aspect, a communication system of a first vehicle of the first subset is configured to transmit the first message and the interworking communication system is configured to transmit the second message to a base station or access point.

In still another aspect, the interworking communication system is further configured to receive a third message in the second V2X RAT format using the second V2X RAT, and to send information comprised in the third message in a fourth message in the first V2X RAT format using the first V2X RAT.

In some aspects, the interworking vehicle is comprised in the first subset or the second subset; and the platoon may comprise a platoon management entity, which may be comprised in a vehicle in either the first or second subset. The first and second subset may comprise ground vehicles.

The examples and embodiments are presented only by way of example and are not meant to limit the scope of the subject matter described herein. Each example embodiment presented above may be combined, in whole or in part, with the other examples. Further, variations of these examples will be apparent to those in the art and are considered to be within the scope of the subject matter described herein. Some steps or acts in a process or method may be reordered or omitted, and features and aspects described in respect of one embodiment may be incorporated into other described embodiments.

The data employed by the systems, devices, and methods described herein may be stored in one or more data stores. The data stores can be of many different types of storage devices and programming constructs, such as RAM, ROM, flash memory, programming data structures, programming variables, and so forth. Code adapted to provide the systems and methods described above may be provided on many different types of computer-readable media including computer storage mechanisms (e.g., CD-ROM, diskette, RAM, flash memory, computer hard drive, etc.) that contain instructions for use in execution by one or more processors to perform the operations described herein. The media on which the code may be provided is generally considered to be non-transitory or physical.

Computer components, software modules, engines, functions, and data structures may be connected directly or indirectly to each other in order to allow the flow of data needed for their operations. Various functional units have been expressly or implicitly described as modules, engines, or similar terminology, in order to more particularly emphasize their independent implementation and operation. Such units may be implemented in a unit of code, a subroutine unit, object, applet, script or other form of code. Such functional units may also be implemented in hardware circuits comprising custom VLSI circuits or gate arrays; field-programmable gate arrays; programmable array logic; programmable logic devices; commercially available logic chips, transistors, and other such components. Functional units need not be physically located together, but may reside in different locations, such as over several electronic devices or memory devices, capable of being logically joined for execution. Functional units may also be implemented as combinations of software and hardware, such as a processor operating on a set of operational data or instructions.

Use of any particular term should not be construed as limiting the scope or requiring experimentation to implement the claimed subject matter or embodiments described herein. Any suggestion of substitutability of the data processing systems or environments for other implementation means should not be construed as an admission that the invention(s) described herein are abstract, or that the data processing systems or their components are non-essential to the invention(s) described herein.

A portion of the disclosure of this patent document contains material which is or may be subject to one or more of copyright, design, or trade dress protection, whether registered or unregistered. The rightsholder has no objection to the reproduction of any such material as portrayed herein through facsimile reproduction of this disclosure as it appears in the Patent Office records, but otherwise reserves all rights whatsoever.

The invention claimed is:

1. A communication system comprised in a first vehicle of a platoon for supporting a plurality of vehicle-to-everything radio access technologies (V2X RATs), comprising:
    at least one microprocessor configured to:
        transmit, using a first V2X RAT of the plurality of V2X RATs, to at least one platoon entity of a platoon implementing the first V2X RAT, an indication that the communication system is available to support an interworking function for providing simultaneous access to a second V2X RAT of the plurality of V2X RATs, the platoon comprising at least one other vehicle; and
        receive, using one of the plurality of V2X RATs, an instruction from a platoon management entity to provide the interworking function; and
        receive, using one of the plurality of V2X RATs, an instruction from the platoon management entity to alter a physical position of the first vehicle in the platoon.

2. The communication system of claim 1, wherein the at least one microprocessor is further configured to, while providing the interworking function:
    receive, using the first V2X RAT, a first message in a first V2X RAT format; and
    transmit, using the second V2X RAT, information comprised in the first message in a second message, wherein the second message is in a second V2X RAT format.

3. The communication system of claim 1, wherein the indication comprises:
    an identification of each of the plurality of V2X RATs;
    an indication whether the communication system is currently providing the interworking function; and
    an identifier for the communication system.

4. The communication system of claim 1, comprised in a portable mobile device.

5. The communication system of claim 1, wherein the at least one microprocessor is configured to transmit the indication upon a triggering event associated with the first vehicle comprising the communication system, wherein the triggering event comprises one of:
    the first vehicle comprising the communication system arriving at a predefined location; and
    alteration of a configuration of the first vehicle comprising the communication system.

6. The communication system of claim 1, wherein the at least one microprocessor is further configured to receive, using one of the plurality of V2X RATs, an instruction to join the platoon.

7. The communication system of claim 1, wherein the at least one platoon entity is a platoon management entity.

8. The communication system of claim 1, wherein the at least one platoon entity is a stationary server.

9. The communication system of claim 1, wherein the plurality of V2X RATs includes at least one of ETSI ITS, SAE DSRC, and SAE C-V2X.

10. The communication system of claim 1, wherein the vehicle is a ground vehicle.

11. The communication system of claim 1, wherein the vehicle is an aerial vehicle.

12. A method for supporting a plurality of vehicle-to-everything radio access technologies (V2X RATs), comprising:
    at least one microprocessor in a communication system comprised in a first vehicle of a platoon transmitting, using a first V2X RAT of the plurality of V2X RATs, to at least one platoon entity of a platoon implementing the first V2X RAT, an indication that the communication system is available to support an interworking function for providing simultaneous access to the plurality of V2X RATs, the platoon comprising at least one other vehicle; and
    the at least one microprocessor receiving, using one of the plurality of V2X RATs, an instruction from a platoon management entity to provide the interworking function; and
    the at least one microprocessor receiving, using one of the plurality of V2X RATs, an instruction from the platoon management entity to alter a physical position of the first vehicle in the platoon.

13. The method of claim 12, wherein providing the interworking function comprises:
    receiving, using the first V2X RAT, a first message in a first V2X RAT format; and
    transmitting, using a second V2X RAT of the plurality of V2X RATs, information comprised in the first message in a second message, wherein the second message is in a second V2X RAT format.

14. The method of claim 12, wherein the indication comprises:
an identification of each of the plurality of V2X RATs;
an indication whether the communication system is currently providing the interworking function; and
an identifier for the communication system.

15. The method of claim 12, wherein the communication system is comprised in a portable mobile device.

16. The method of claim 12, wherein transmitting the indication occurs upon a triggering event associated with the first vehicle comprising the communication system, wherein the triggering event comprises one of:
the first vehicle comprising the communication system arriving at a predefined location; and
alteration of a configuration of the first vehicle comprising the communication system.

17. The method of claim 12, further comprising the at least one microprocessor receiving, using one of the plurality of V2X RATs, an instruction to join the platoon.

18. The method of claim 12, wherein the at least one platoon entity is a platoon management entity.

19. The method of claim 12, wherein the at least one platoon entity is a stationary server.

20. The method of claim 12, wherein the plurality of V2X RATs includes at least one of ETSI ITS, SAE DSRC, and SAE C-V2X.

21. The method of claim 12, wherein the first vehicle is a ground vehicle.

22. The method of claim 12, wherein the first vehicle is an aerial vehicle.

23. A method implemented by a platoon management entity managing a first platoon of vehicles, the first platoon comprising members communicating using communication systems configured to use a first vehicle-to-everything radio access technology (V2X RAT), the method comprising:
determining that an interworking function for providing simultaneous access to a plurality of V2X RATs including the first V2X RAT is available from an interworking vehicle comprising an interworking communication system capable of supporting the interworking function;
including the interworking vehicle in the first platoon; and
transmitting an instruction to the interworking communication system to alter a physical position of the interworking vehicle in the first platoon.

24. The method of claim 23, further comprising:
the platoon management entity determining availability of a further vehicle comprising a further communication system to join the first platoon, the further communication system being configured to communicate using a second V2X RAT of the plurality of V2X RATs;
the platoon management entity transmitting, via the interworking communication system utilizing both the first V2X RAT and a second V2X RAT of the plurality of V2X RATs, a request to join the first platoon to the further vehicle;
the platoon management entity receiving, via the interworking communication system, an acknowledgement from the further vehicle; and
the platoon management entity including the further vehicle in the first platoon.

25. The method of claim 24, wherein determining availability of the further vehicle to join the first platoon comprises the platoon management entity receiving, from the interworking communication system, an indication of the availability of the further vehicle to join the first platoon, the further communication system in communication with the interworking communication system.

26. The computing system of claim 25, wherein the at least one microprocessor is configured to detect the cessation of the interworking function by receiving, from the interworking communication system, an indication of cessation of the interworking function.

27. The method of claim 24, wherein determining availability of the further vehicle to join the first platoon comprises obtaining an indication of the availability of the further vehicle to join the first platoon from a server.

28. The method of claim 24, wherein the further vehicle is a member of a second platoon, and wherein transmitting the request to join the first platoon comprises transmitting the request to a platoon management entity for the second platoon.

29. The method of claim 24, further comprising the platoon management entity:
detecting a cessation of the interworking function;
transmitting, via the interworking communication system, a message to the further vehicle removing the further vehicle from the first platoon; and
removing the interworking vehicle from the first platoon.

30. The method of claim 29, wherein the platoon management entity detecting the cessation of the interworking function comprises receiving, from the interworking communication system, an indication of cessation of the interworking function.

31. The method of claim 23, wherein determining that the interworking function is available comprises the platoon management entity receiving, from the interworking communication system via the first V2X RAT, an indication that the communication system is available to support the interworking function.

32. The method of claim 31, wherein including the interworking vehicle in the first platoon comprises, after receiving the indication, the platoon management entity transmitting an instruction to provide the interworking function to the interworking communication system.

33. The method of claim 23, further comprising:
the platoon management entity transmitting a first message to a first vehicle in the first platoon, the first message in a first V2X RAT format using the first V2X RAT, wherein the first vehicle is configured to communicate using the first V2X RAT;
the platoon management entity transmitting a second message to a second vehicle in the first platoon wherein the second vehicle is configured to communicate using the second V2X RAT, comprising transmitting the second message in a first V2X RAT format using the first V2X RAT to the interworking communication system for transmitting to the second vehicle.

34. The method of claim 23, wherein the platoon management entity is comprised in a lead vehicle of the first platoon.

35. The method of claim 23, wherein the platoon management entity includes the interworking vehicle in the platoon prior to determining that the interworking function is available.

36. The method of claim 23, wherein the platoon management entity is comprised in a server system.

37. The method of claim 23, wherein the platoon management entity is comprised in a roadside unit.

38. A computing system comprising at least one microprocessor managing a first platoon of vehicles, the first platoon comprising members communicating using communication systems configured to use a first vehicle-to-everything radio access technology (V2X RAT), wherein the at least one microprocessor is configured to:
  determine that an interworking function for providing simultaneous access to a plurality of V2X RATs including the first V2X RAT is available from an interworking vehicle comprising an interworking communication system capable of supporting the interworking function; and
  include the interworking vehicle in the first platoon; and
  transmit an instruction to the interworking communication system to alter a physical position of the interworking vehicle in the first platoon.

39. The computing system of claim 38, wherein the at least one microprocessor is further configured to:
  determine availability of a further vehicle comprising a further communication system to join the first platoon, the further communication system being configured to communicate using a second V2X RAT of the plurality of V2X RATs;
  transmit, via the interworking communication system utilizing both the first V2X RAT and a second V2X RAT of the plurality of V2X RATs, a request to join the first platoon to the further vehicle;
  receive, via the interworking communication system, an acknowledgement from the further vehicle; and
  include the further vehicle in the first platoon.

40. The computing system of claim 39, wherein determining availability of the further vehicle to join the first platoon comprises receiving, from the interworking communication system, an indication of the availability of the further vehicle to join the first platoon, the further communication system in communication with the interworking communication system.

41. The computing system of claim 39, wherein determining availability of the further vehicle to join the first platoon comprises obtaining an indication of the availability of the further vehicle to join the first platoon from a server.

42. The computing system of claim 39, wherein the further vehicle is a member of a second platoon, and wherein transmitting the request to join the first platoon comprises transmitting the request to a platoon management entity for the second platoon.

43. The computing system of claim 39, wherein the at least one microprocessor is further configured to:
  detect a cessation of the interworking function;
  transmit, via the interworking communication system, a message to the further vehicle removing the further vehicle from the first platoon; and
  remove the interworking vehicle from the first platoon.

44. The computing system of claim 38, wherein determining that the interworking function is available comprises receiving, from the interworking communication system via the first V2X RAT, an indication that the communication system is available to support the interworking function.

45. The computing system of claim 44, wherein including the interworking vehicle in the first platoon comprises, after receiving the indication, transmitting an instruction to provide the interworking function to the interworking communication system.

46. The computing system of claim 38, wherein the at least one microprocessor is further configured to:
  transmit a first message to a first vehicle in the first platoon, the first message in a first V2X RAT format using the first V2X RAT, wherein the first vehicle is configured to communicate using the first V2X RAT;
  transmit a second message to a second vehicle in the first platoon wherein the second vehicle is configured to communicate using the second V2X RAT, comprising transmitting the second message in a first V2X RAT format using the first V2X RAT to the interworking communication system for transmitting to the second vehicle.

47. The computing system of claim 38, comprised in a lead vehicle of the first platoon.

48. The computing system of claim 38, wherein the at least one microprocessor is configured to include the interworking vehicle in the platoon prior to determining that the interworking function is available.

49. The computing system of claim 38, comprised in a server system.

50. The computing system of claim 38, comprised in a roadside unit.

51. A platoon, comprising:
  a first subset of one or more vehicles, the first subset comprising a first vehicle with a corresponding communication system configured to communicate using a first vehicle-to-everything radio access technology (V2X RAT);
  a second subset of one or more vehicles, the second subset comprising a second vehicle with a corresponding communication system configured to communicate using a second V2X RAT; and
  an interworking vehicle comprising an interworking communication system configured to communicate using both the first and second V2X RAT, the interworking communication system being configured to receive a first message in a first V2X RAT format using the first V2X RAT, send information comprised in the first message in a second message in a second V2X RAT format using the second V2X RAT, and to receive an instruction from a platoon management entity to alter a physical position of the interworking vehicle in the platoon.

52. The platoon of claim 51, wherein a communication system of the first vehicle of the first subset is configured to transmit the first message and a communication system of the second vehicle of the second subset is configured to receive the second message.

53. The platoon of claim 51, wherein a communication system of the first vehicle of the first subset is configured to transmit the first message and the interworking communication system is configured to transmit the second message to a roadside unit (RSU).

54. The platoon of claim 51, wherein a communication system of the first vehicle of the first subset is configured to transmit the first message and the interworking communication system is configured to transmit the second message to a base station or access point.

55. The platoon of claim 51, wherein the interworking communication system is further configured to receive a third message in the second V2X RAT format using the second V2X RAT, and to send information comprised in the third message in a fourth message in the first V2X RAT format using the first V2X RAT.

56. The platoon of claim 51, wherein the interworking vehicle is comprised in the first subset.

57. The platoon of claim 51, wherein the interworking vehicle is comprised in the second subset.

58. The platoon of claim 51, further comprising a platoon management entity.

59. The platoon of claim 58, wherein the platoon management entity is comprised in a vehicle in either the first subset or the second subset.

60. The platoon of claim 51, wherein the first subset and the second subset comprise ground vehicles.

\* \* \* \* \*